(12) United States Patent
Cook

(10) Patent No.: US 7,686,965 B2
(45) Date of Patent: Mar. 30, 2010

(54) CENTRIFUGAL FLUID FILTRATION DEVICES, SYSTEMS AND METHODS

(76) Inventor: Melvin W. Cook, 637 San Benito Ave., Los Gatos, CA (US) 95030

(*) Notice: Subject to any disclaimer, the term of this patent is extended or adjusted under 35 U.S.C. 154(b) by 31 days.

(21) Appl. No.: 11/756,007

(22) Filed: May 31, 2007

(65) Prior Publication Data
US 2007/0284319 A1 Dec. 13, 2007

Related U.S. Application Data

(60) Provisional application No. 60/803,614, filed on May 31, 2006, provisional application No. 60/803,616, filed on May 31, 2006.

(51) Int. Cl.
*C02F 1/38* (2006.01)
*B01D 33/41* (2006.01)
(52) U.S. Cl. ............ 210/781; 210/369; 210/380.1
(58) Field of Classification Search ............ 210/360.1, 210/380.1, 603, 609, 631, 369, 780, 781; 55/345
See application file for complete search history.

(56) References Cited

U.S. PATENT DOCUMENTS

| | | | |
|---|---|---|---|
| 3,400,074 A | 9/1965 | Grenci | |
| 3,596,768 A * | 8/1971 | Whitten, Jr. | 210/167.31 |
| 3,989,629 A | 11/1976 | Donovan | |
| 4,046,315 A | 9/1977 | Klingenberg et al. | |
| 4,145,293 A | 3/1979 | Cook | |
| 4,172,795 A | 10/1979 | Kurtz et al. | |
| 4,230,564 A | 10/1980 | Keefer | |
| 4,268,385 A | 5/1981 | Yoshikawa | |
| 4,295,600 A | 10/1981 | Saget | |

(Continued)

FOREIGN PATENT DOCUMENTS

| | | |
|---|---|---|
| CA | 1290700 | 10/1991 |
| EP | 1057534 A1 | 12/2000 |
| WO | WO 94/07586 | * 4/1994 |

OTHER PUBLICATIONS

Bailey, et al. Clean energy technologies: A preliminary inventory of the potential for electricity generation. E.O. Lawrence Berkeley National Laboratory. Apr. 2005; LBNL-57451: 41 pages.

(Continued)

*Primary Examiner*—Fred Prince

(57) ABSTRACT

Fluid filtration devices, systems and methods are disclosed. The device comprises, for example, an influent feed tube; an influent receiving bowl in fluid communication with the influent feed tube; and a plurality of radial arms having filters therein configured to rotate about an axis within the influent receiving bowl. The fluid filtration devices, which can be configured to filter a wide variety of fluids, comprises: an influent feed tube; an influent receiving bowl in fluid communication with the influent feed tube; and a plurality of radial arms having filters therein configured to rotate about an axis within the influent receiving bowl. Additionally, methods are provided for that comprise, for example: obtaining an influent from a target source of fluid to be filtered; filtering the influent in a first filtration step; filtering the influent in a second filtration step upon receiving effluent from the first filtration step by transferring influent through a plurality of radial arms by rotating the radial arms having filters disposed therein about an axis in a filtration unit; and emitting a final filtered fluid effluent.

1 Claim, 19 Drawing Sheets

Elevation View

U.S. PATENT DOCUMENTS

| Patent No. | | Date | Inventor |
|---|---|---|---|
| 4,332,350 | A | 6/1982 | McClellan |
| 4,340,487 | A | 7/1982 | Lyon |
| 4,451,371 | A | 5/1984 | Peck |
| 4,661,263 | A | 4/1987 | Roark |
| 4,675,114 | A | 6/1987 | Zagyvai et al. |
| 4,683,058 | A | 7/1987 | Lyman et al. |
| 4,722,792 | A | 2/1988 | Miyagi et al. |
| 4,790,942 | A | 12/1988 | Shmidt et al. |
| 4,832,851 | A | 5/1989 | Bowers et al. |
| 4,876,013 | A | 10/1989 | Shmidt et al. |
| 4,886,597 | A | 12/1989 | Wild et al. |
| 4,895,666 | A | 1/1990 | Franzen et al. |
| 4,911,847 | A | 3/1990 | Shmidt et al. |
| 4,925,576 | A | 5/1990 | Gotlieb et al. |
| 4,997,575 | A | 3/1991 | Hultsch |
| 5,011,609 | A | 4/1991 | Fink |
| 5,021,158 | A | 6/1991 | Schiele |
| 5,032,258 | A | 7/1991 | Hultsch |
| 5,104,047 | A | 4/1992 | Simmons |
| 5,160,441 | A | 11/1992 | Lundquist |
| 5,169,525 | A | 12/1992 | Gerteis |
| 5,176,825 | A | 1/1993 | Hadjis et al. |
| 5,188,644 | A | 2/1993 | Landy |
| 5,194,145 | A | 3/1993 | Schoendorfer |
| 5,401,422 | A | 3/1995 | Mignot |
| 5,431,814 | A | 7/1995 | Jorgensen |
| 5,466,384 | A | 11/1995 | Prevost et al. |
| 5,468,396 | A | 11/1995 | Allen et al. |
| 5,564,105 | A | 10/1996 | Alvino et al. |
| 5,566,605 | A | 10/1996 | Lebrun et al. |
| 5,567,321 | A | 10/1996 | Weber et al. |
| 5,690,813 | A | 11/1997 | Coale |
| 5,868,926 | A | 2/1999 | Hickok et al. |
| 5,891,347 | A | 4/1999 | Matsumoto |
| 5,968,355 | A | 10/1999 | Lee et al. |
| 6,013,181 | A * | 1/2000 | Thellmann ................ 210/266 |
| 6,171,499 | B1 * | 1/2001 | Bouchalat .................. 210/603 |
| 6,302,919 | B1 | 10/2001 | Chambers et al. |
| 6,402,950 | B1 | 6/2002 | Nix et al. |
| 6,440,316 | B1 | 8/2002 | Yoon et al. |
| 6,517,612 | B1 | 2/2003 | Crouch et al. |
| 6,702,941 | B1 | 3/2004 | Haq et al. |
| 6,802,983 | B2 | 10/2004 | Mullee et al. |
| 6,887,290 | B2 | 5/2005 | Strauser et al. |
| 6,890,443 | B2 | 5/2005 | Adams |
| 7,182,866 | B2 * | 2/2007 | Forman ................ 210/321.68 |
| 2002/0038787 | A1 | 4/2002 | Hurwitz et al. |
| 2003/0111411 | A1 | 6/2003 | Lorenz |
| 2004/0079706 | A1 | 4/2004 | Mairal et al. |
| 2005/0098493 | A1 | 5/2005 | Danner |
| 2005/0133466 | A1 | 6/2005 | Bridges |
| 2007/0102276 | A1 | 5/2007 | Lubman et al. |
| 2007/0278146 | A1 | 12/2007 | Cook |

OTHER PUBLICATIONS

The Program on Energy and Sustainable Development. Energy Research at Stanford 2005-2006. Available at http://gcep.stanford.edu/pdfs/SI3U6jOMPAIgwkaiBD_77Q/victor_ers06.pdf. Accessed on Jun. 21, 2007.

Wastewater treatment. ZENON Membrane Solutions. 1997. GE Water & Process Technologies. Availabe at http://www.zenon.com/markets/wastewater/. Accessed on Jun. 14, 2007.

What goes around comes around: innovative centrifuge at aerospace plant extends fluid life, enhances part quality; Fluids. Tooling & Production. Feb. 1, 2002. (2 pages).

\* cited by examiner

Elevation View

Side View

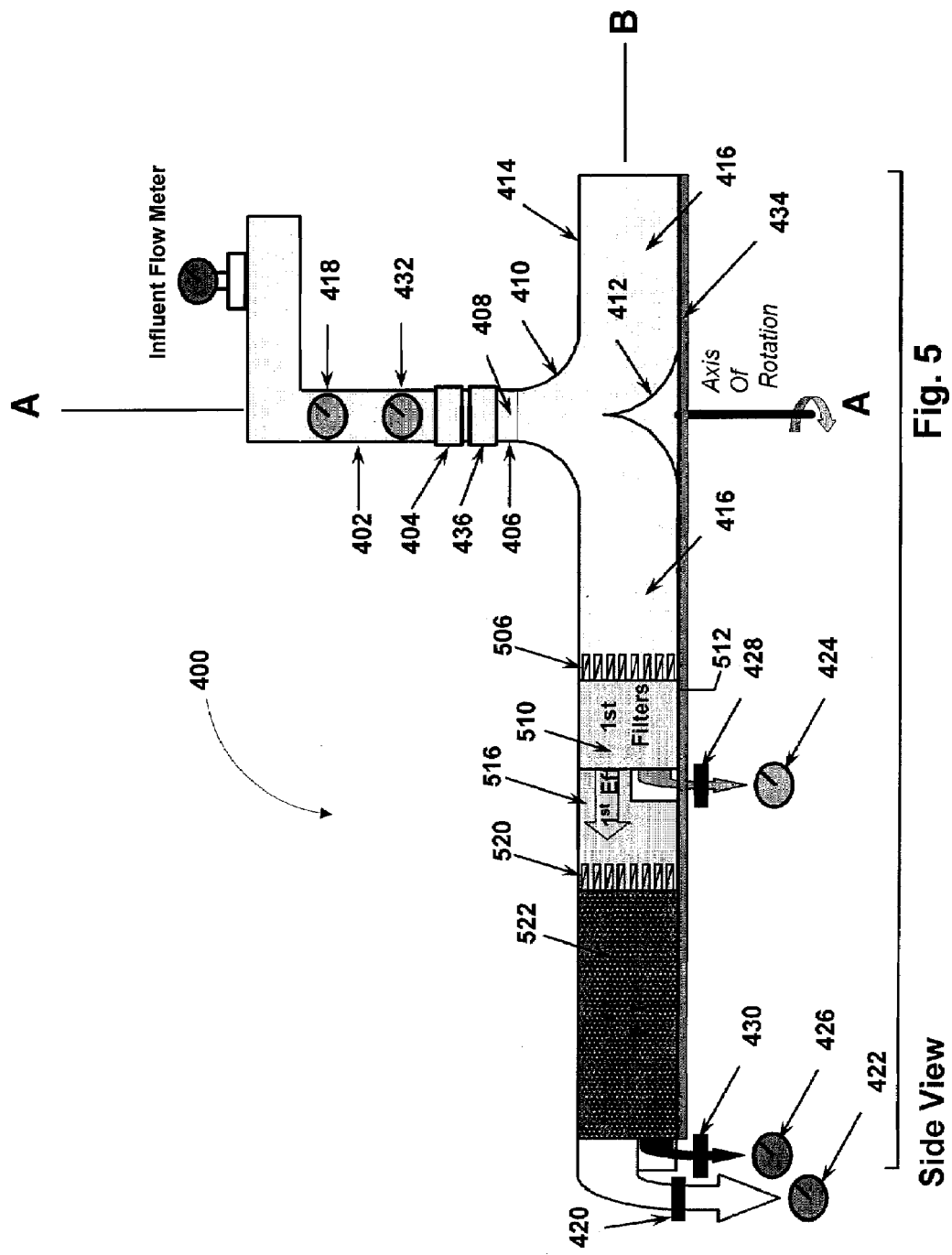

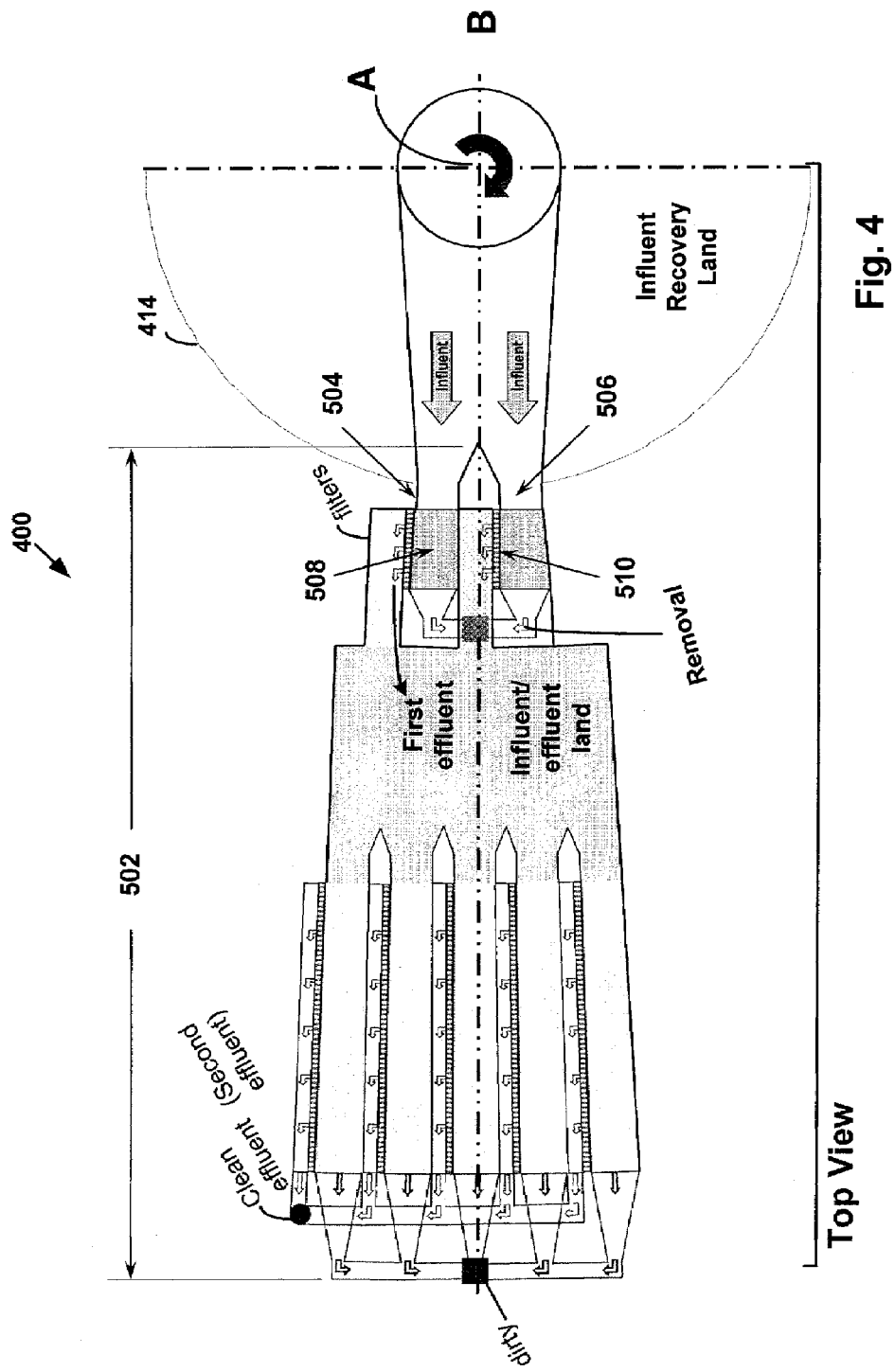

Top View

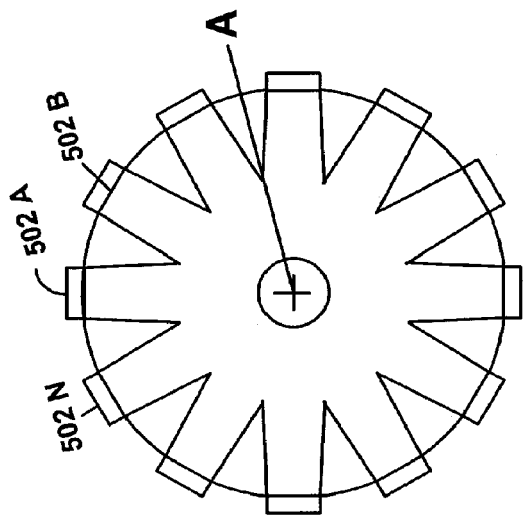
Fig. 5e Top View
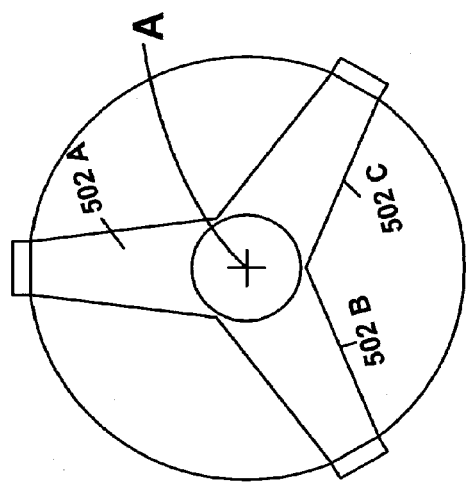
Fig. 5d Top View
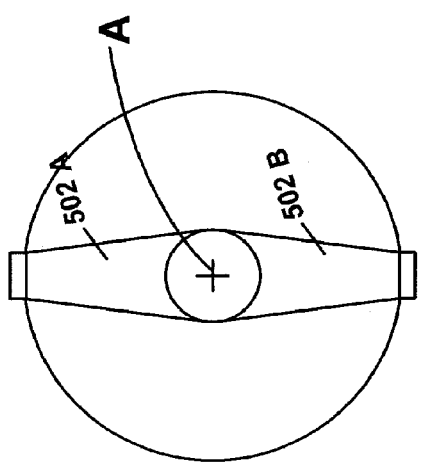
Fig. 5c Top View Side View

CENTRIFUGAL FLUID FILTRATION DEVICES, SYSTEMS AND METHODS

CROSS-REFERENCE

This application claims the benefit of U.S. Provisional Application No. 60/803,614, filed May 31, 2006 and 60/803,616 filed May 31, 2006 which are incorporated herein by reference in its entirety.

BACKGROUND OF THE INVENTION

It has been said that "water is the oil of the $21^{st}$ century" because of its huge demand and finite supply. Although it is estimated that greater than 75% of the earth's surface is covered by water, only a very small fraction of that water is drinkable or usable without treatment. Over 96% of water is ocean, seas and bays. Of fresh water, nearly 70% is trapped in ice caps, glaciers and permanent snow. (See, www.earthobservatory.nasa.gov). Salt water, which represents the vast majority of water, requires an expensive and energy intense desalination process before it is can be used for drinking.

The U.S. has more than 97,000 water treatment facilities. The projected annual growth rate for water treatment is 5%-8% over the next decade. Furthermore, the Environmental Protection Agency (EPA) has projected that this increase will come primarily from population growth and urban expansion. Because of increased demand, there is recognized a need to upgrade equipment used in the water treatment industry, particularly the wastewater treatment industry. Equipment installed under the Clean Water Act of 1972 is currently approaching the end of its projected lifecycle. In addition, the water treatment standards mandated by the EPA do, from time to time, become more stringent.

In addition to a limited access to fresh water, we face an increasing dilemma related to energy. "By many measures, the world's energy system"—including electricity—"is not keeping pace with the goals of sustainable development." In an attempt to meet these demands, " . . . the established system generates harmful particulate and chemical pollutants that threaten the health and the environment of the world's people." See, the Program on Energy and Sustainable Development at Stanford University, January 2006. With respect to the United States, it is well known that our own power systems are continually faced with an ever-increasing demand for more electricity. We are also confronted with the ongoing need to produce additional electricity without increasing the demand for more water and without further contributing to emissions.

Thus, the issues pertaining to water as a resource and energy reserves are intertwined on many levels. An April 2005 Lawrence Berkeley National Laboratory Study estimated the electricity potential from methane produced by the anaerobic digestion of wastewater biosolids, from Industrial, Agriculture, and Municipal facilities. See E. O. Lawrence Berkeley National Laboratory Study, April 2005, LBNL-57451. The result demonstrated that, notwithstanding energy requirements to process water, the processing of water can itself be a source of energy.

Traditionally, water treatment facilities are constructed to take in wastewater as influent 102 and process it through a variety of screenings and treatments, as illustrated in FIG. 1, prior to the releasing the effluent 120 to the ocean, bay, river or lake 122. Solids and grit are removed via a bar screen 104 and a grit screen 106 and sent to a landfill 112. Wastewater that passes through the bar screen 104 and the grit screen 106 is subjected to primary treatment 109 in a large sedimentation lagoon or tank 114. The sedimentation tank 114 enables particle settling or sedimentation. The sedimentation tank has an influent which travels in at a flow rate, Q, the influent travels through the tank to an opposing end where it exits as effluent. During the process of traveling from the inlet (as influent) to the outlet (as effluent), particles settle out in a settling zone to form a sludge at the bottom of the tank. A variety of techniques can be employed to remove the particles from the sedimentation tank that would be known to those skilled in the art.

From the sedimentation tank 114 the sediment flows into a stabilization lagoon or tank 116 before dewatering 118 and reuse or disposal 112'. The effluent flows from the sedimentation tank 114 to an aeration tank 117 where it is brought into contact with air prior to transferring the effluent to a second sedimentation lagoon 114' as part of a secondary treatment process 115. After secondary treatment 115 in the aeration tank 117 and sedimentation lagoon 114', the effluent can be processed with a final disinfectant step 121 by placing into a chlorination basin 119 prior to emitting the final effluent 120 into the ocean, bay, river or lake 122. The sedimentation can be placed into a stabilization lagoon 116' before dewatering 118, reuse or disposal 112'.

Conventional treatment technologies include, for example, a pumped diffusion flash mixer for chemical addition, flocculation basin, sedimentation basin and granular medium filter. The residuals from the wastewater treatment plant are returned to the source or stored in ponds. For example in arid locations, drying ponds are sometimes used. More often, mechanical processing is employed in conjunction with the residuals to reduce the volume of the residuals. Yet another treatment mechanism that can be used after primary treatment is provided by G.E. Water & Processing Technologies and includes ZeeWeed based membrane bioreactor (MBR). The ZeeWeed MBR is a basic production train that consists of a biological reactor, membrane basin, permeate pump, air blowers and automated control equipment. The trains are simply expanded to meet capacity requirements as needed. Membrane bioreactor systems offer a significantly smaller footprint and simplified operation than the comparable conventional activated sludge systems shown in FIG. 1. However, the systems are still quite large. (See, http://www.zenon.com/markets/wastewater/).

Currently there are several important issues facing the design of current wastewater treatment facilities for which there has been an insufficient solution. First, most wastewater treatment facilities consume a significant amount of energy during operation. Second, wastewater treatment facilities typically require a substantial amount of land. Third, wastewater treatment facilities often emit an unpleasant odor which can make them undesirable to place strategically in an urban setting, notwithstanding the space requirements. Fourth, wastewater treatment facilities present a potential security risk because the facilities are part of a critical infrastructure that must be protected to ensure an adequate supply of water.

SUMMARY OF THE INVENTION

An object of the invention is directed to a solution for wastewater treatment which is scaleable, volume adjustable and employs centrifugal fluid filtration. Furthermore, the devices, systems and methods eliminate five separate operations typically performed in wastewater treatment which will enable the device, systems and method of the invention to operate in less time and in less space, at lower cost, while consuming less than one-third the electricity used to process the same amount of wastewater using current solutions.

An object of the invention is to provide fluid filtration devices, systems and methods that combine filters, centrifugation and Coriolis acceleration induced antifouling. The devices, systems and methods remove fluid quantitatively from constituents while removing organic solids.

An object of the invention is to provide a system that is capable of operating continuously while automatically accommodating a broad range of influent flow volumes and/or a broad range of influent constituent concentrations within the same multi-function continuous feed Single Pass Centrifugal Fluid Filtration Device. Further, other embodiments of this invention have an influent flow which may be comprised of a fluid/solid matrix in which the fluid can be either a liquid or a gas, or any combination thereof, and the constituents therein can be dissolved, suspended, settleable, or particulate, or any combination thereof.

Yet another aspect of the invention provides for a radial arm/filter unit that has filters attached to each arm in series or parallel. The influent conduits of the radial arm enhance the Coriolis forces on the influent across the membrane medium.

In one embodiment, the present invention has back-flush capability. This back-flush capability may be, but is not limited to, manually and/or algorithmically controlled, may be sequential back-flushing, or back-flushing may also balance the rotor during operation.

An aspect of the invention is directed to a fluid filtration device useful for filtering fluids such as liquids or gases. The fluid filtration device, which can be configured to filter a wide variety of fluids, comprises: an influent feed tube; an influent receiving bowl in fluid communication with the influent feed tube; and a plurality of radial arms having filters therein configured to rotate about an axis within the influent receiving bowl.

Another aspect of the invention is directed to a fluid filtration device comprising: an influent feed tube; an influent receiving bowl in fluid communication with the influent feed tube; a plurality of radial arms having filters therein configured to rotate about an axis within the influent receiving bowl; and one or more vanes which increase an efficiency with which fluid is transferred through the filtration device.

Still another aspect of the invention is directed to a fluid filtration device comprising: an influent feed tube; an influent receiving bowl in fluid communication with the influent feed tube; and a centrifugal filter that generates a final effluent; wherein the fluid filtration device has a capacity selected from the group consisting of (a) tens of milliliters of a liquid per minute; (b) tens of cubic meters of gases per minute; (c) hundreds of thousands of gallons of a liquid per day; and (d) millions of cubic meters of gases per day.

An additional aspect of the invention is directed to a fluid filtration device comprising: an influent feed tube; an influent receiving bowl in fluid communication with the influent feed tube; and a centrifugal filter that generates a final effluent; wherein the fluid filtration device receives energy from the influent during the filtering process.

Still another aspect of the invention is directed to a fluid filtration device comprising: an influent feed tube; an influent receiving bowl in fluid communication with the influent feed tube; and a centrifugal filter that generates a final effluent; wherein the fluid filtration device achieves an energy efficiency of between 10-70%.

Wastewater treatment systems are also contemplated. Wastewater systems comprising: an influent feed tube; an influent receiving bowl in fluid communication with the influent feed tube; and a centrifugal filter that generates a final effluent; wherein the wastewater treatment system does not have one or more of a sedimentation tank, a stabilization tank, an aeration tank, a chlorination basin, or a dewatering processor.

A plurality of radial arms can be two or more, multiples of two or multiples of three in any of the designs. Additionally, a controller can be provided for controlling a rate at which the radial arms rotate about the axis. Moreover, one or more vanes can be positioned within one or more of the influent feed tube and radial arms to control the speed and direction of travel of the influent. The vanes can be optimally configured to enhance a Coriolis effect on the influent which has an antifouling effect as the influent crosses the filters disposed within the radial arms. In some configurations, an anaerobic digester can be provided that is in communication with the fluid filtration device. The anaerobic digester can, for example, generate methane from an undigested biosolids it receives from the fluid filtration device. Furthermore, a disinfector can be provided for disinfecting a filtered fluid effluent prior to emission, such as prior to emission to an external water supply such as an ocean, bay, river, stream, lake or subterranean water table. One or more sensors can be provided to communicate a sensed parameter to a controller.

Yet another aspect of the invention is directed to a method for performing fluid filtration. The method comprises: obtaining an influent from a target source of fluid to be filtered; filtering the influent in a first filtration step; filtering the influent in a second filtration step upon receiving effluent from the first filtration step by transferring influent through a plurality of radial arms by rotating the radial arms having filters disposed therein about an axis in a filtration unit; and emitting a final filtered fluid effluent. Additionally, the method can further comprise obtaining an influent from a wastewater source, receiving energy from the influent during the filtering process, using the vanes to enhance a Coriolis effect on the influent which has an antifouling effect as the influent crosses the filters disposed within the radial arms, emitting an undigested biosolid, which can then be transferred to an anaerobic digester to, for example, generate methane, disinfecting the filtered fluid effluent prior to emission to a water supply; and/or controlling the rate at which the radial arms rotate about an axis.

An additional method is directed to a system for controlling fluid filtration. The method comprises: a fluid filtration device comprising a sensor capable of measuring a parameter of the filtration measuring device; and an information processing system capable of analyzing parameters from the sensor. The information processing system can be configured to receive the parameter measured by the sensor, such as effluent volume, effluent concentration, and effluent constituents, influent volume, influent concentration, and influent constituents. Additionally, the central system can also comprise a central system capable of communicating with an information processing system, a fluid filtration device and a sensor and/or an interactive data entry device for controlling a fluid filtration device in response to parameters from the sensor.

An additional feature of the invention is directed to a radial filtration arm for use in a fluid filtration device comprising: an aperture at a first end for receiving a matrix; one or more filters contained therein for filtering the matrix; a connector for engaging the fluid filtration device. The face of the filter can be configured such that it is parallel to a radial vector. The filters can be two or more filters in parallel or in series. Additionally, an influent conduit can be provided that enhances a Coriolis force of the radial filtration arm. The radial arm can be configured to achieve a balanced flow between a first and second filter. The radial filtration arm can be configured to engage a fluid filtration device. The radial arm can also be attachable to a bowl and/or a centrifuge rotor.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIGS. 4A-C are side views through a vertical plane showing the flow of the water through a fluid filtration device according to the invention;

FIGS. 5A-E illustrate a radial arm component of the fluid filtration system through a horizontal plane;

DETAILED DESCRIPTION OF THE INVENTION

For purposes of illustration of the concepts of the invention, the various features are discussed with respect to wastewater treatment. However, those skilled in the art will appreciate that the teachings can be applied to other industries such as pharmaceutical and food processing. Commercial applications for this invention are numerous and include, but are not limited to: drinking water and wastewater treatment for municipalities; non-community wastewater systems and housing developments; and wastewater treatment for commercial business developments, condominiums, malls, hotels/motels, office buildings, hospitals, resorts, and government and military installations. Additional applications may include, but are not limited to, isolation, separation, purification, removal, recovery, and/or concentration of biological components in the pharmaceutical and biotechnology industries. The device may also be used for water clean-up in power plants; and water and wastewater clean-up in various industries including, but not limited to, dairy, food processing, farming, agriculture, chemical, and petroleum. Additionally, it will be appreciated by those skilled in the art that the principles disclosed herein can be applied to filtration of small quantities of fluid as well as larger quantities of fluid without departing from the scope of the invention. Thus, for example, invention enables a single pass centrifugal fluid filtration device of a size and dimension that is capable of generating the required centrifugal multi-g radial forces necessary to process, in a single pass, fluid/solid matrix volumes as small as, but not limited to, liquids at tens of milliliters per minute or gasses at tens of cubic meters per minute; of a size and dimension that is capable of generating the required centrifugal multi-g radial forces necessary to process, in a single pass, fluid/solid matrix volumes as large as, but not limited to, liquids at hundreds of thousands of gallons per day or gasses at millions of cubic meters per day; or a single pass centrifugal fluid filtration device of any size and dimension that is capable of generating the centrifugal multi-g radial forces necessary to process, in a single pass, any desired fluid/solid matrix volume.

Figure 1:
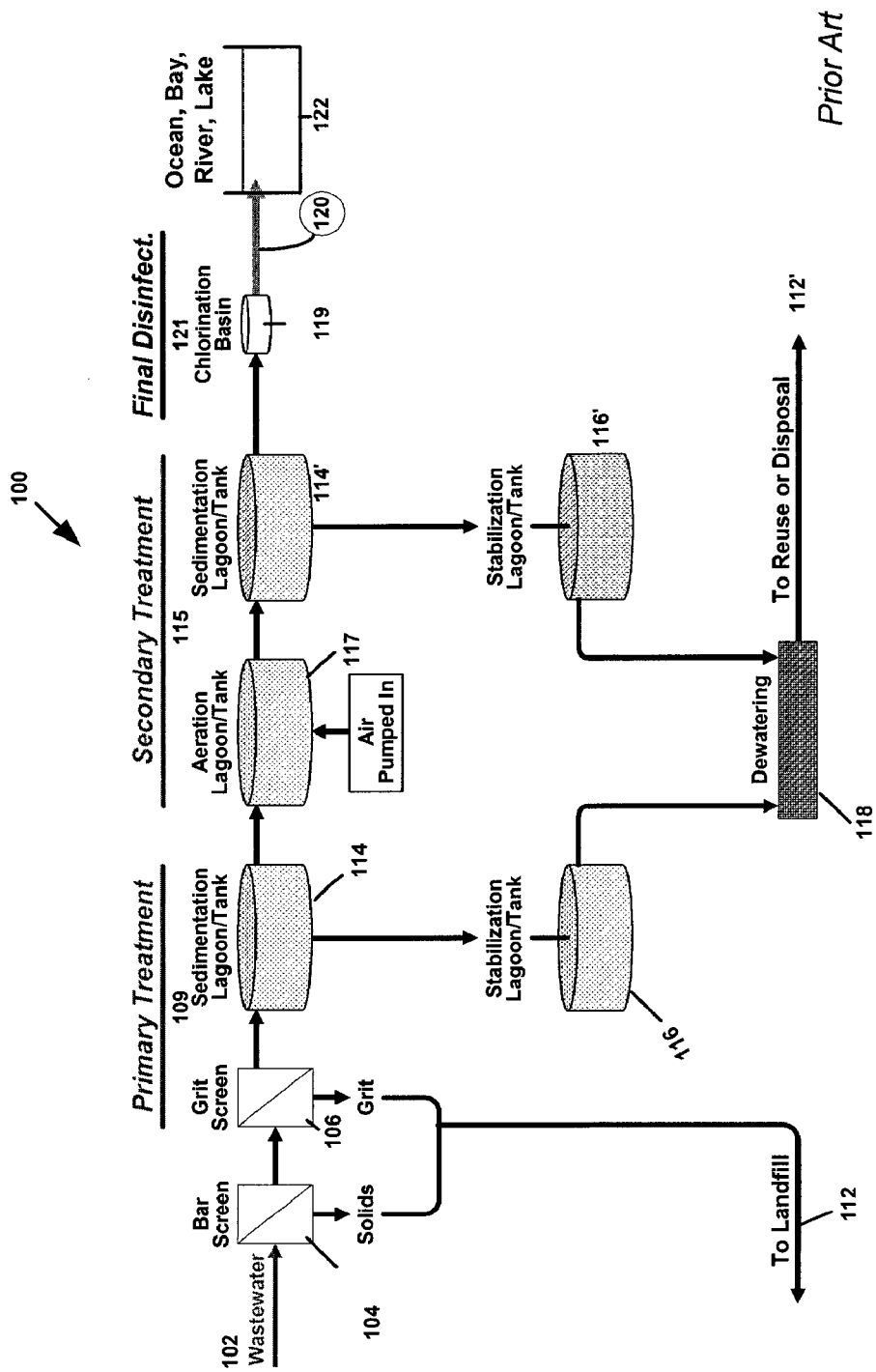
FIG. 1 illustrates a diagram of typical waste water treatment facility.
Figure 2A:
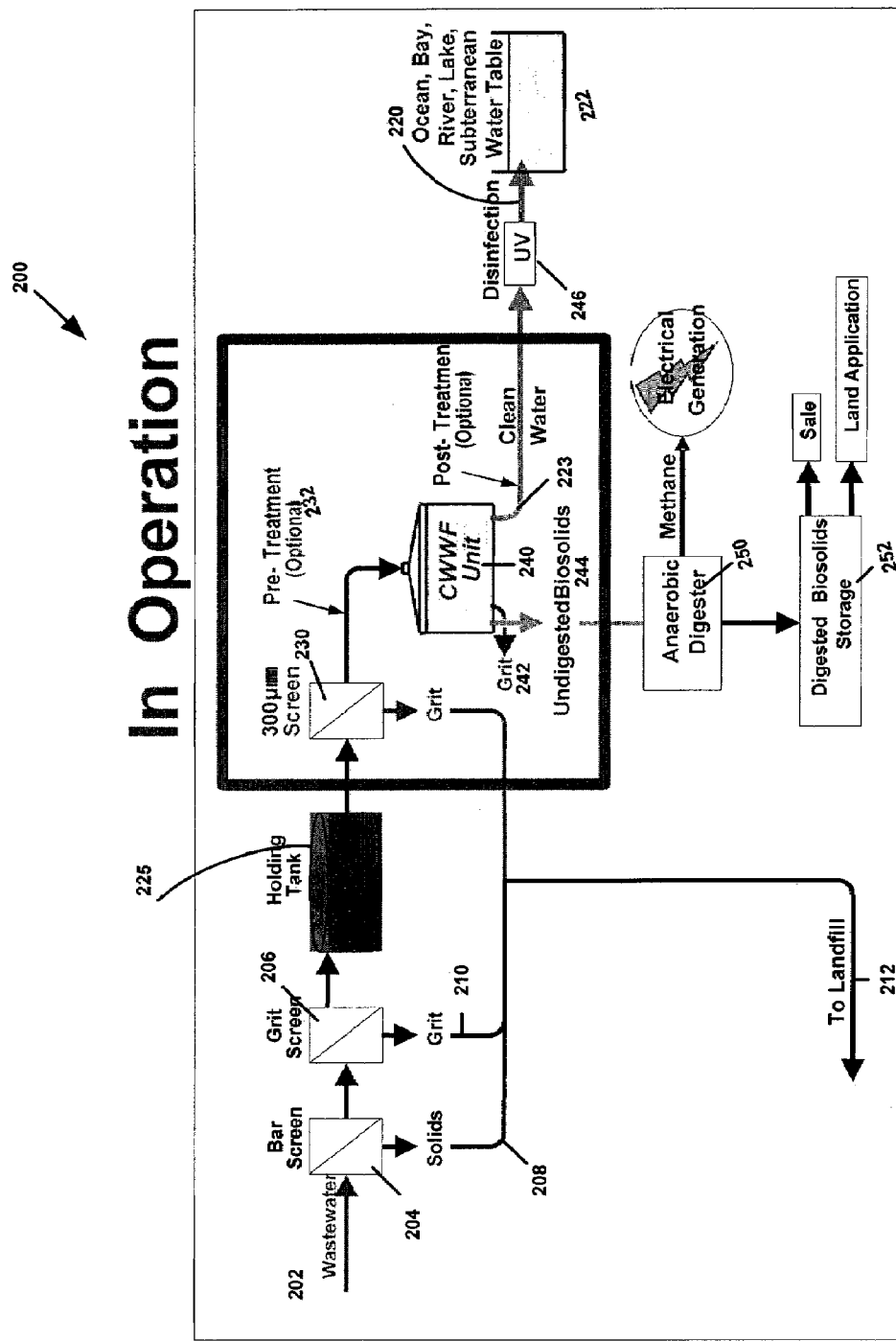
FIGS. 2A-B illustrate a diagram of a wastewater treatment facility utilizing the fluid filtration system of the invention (FIG. 2A) and a diagram of the typical wastewater treatment facility of FIG. 1 with the operations eliminated by this invention boxed (FIG. 2B)

Turning now to FIG. 2A, a system diagram of a wastewater treatment facility 200 utilizing the fluid filtration system of the invention is depicted. As with the water treatment facility depicted in FIG. 1, the system is constructed to take in wastewater as influent 202 and process it through a variety of screenings and treatments prior to the releasing the effluent 220 to the ocean, bay, river, lake or subterranean water table 222. Solids and grit are still removed via suitable mechanisms such as a bar screen 204 and a grit screen 206 and sent to a landfill 212. Wastewater that passes through the bar screen 204 and the grit screen 206 is placed in a holding tank 225. The holding tank 225 typically experiences a continuous flow and therefore is not dependent upon the sedimentation process described with respect to the system of FIG. 1. Unlike the sedimentation tank 114, the holding tank 225 has a minimum volume that is equal to the daily volume of the wastewater treatment facility, plus an allowance for potential sewer system overflow. Accordingly the actual specifications are variable in practice and would be determined by the end user. Overall, however, as a result of the operation of the holding tank 225 relative to the system at large, it typically takes up substantially less space than the currently utilized tanks 114, 117, 114', 116 and 116' of FIG. 1. From the holding tank 225 the wastewater is processed through a 300 µm screen 230, which results in the removal of additional grit which is sent to the landfill 212 with the solids 208 and grit 210 from the prescreening. From the 300 µm screen 230, the wastewater can optionally be run through a pre-treatment process 232, as determined by the specifications of the operator or end user and includes, but is not limited to, selective precipitation. Alternatively, the wastewater can be transferred to a centrifugal fluid filtration system 240, discussed in further detail below, which removes additional grit 242, and undigested biosolids 244. Clean water is then released as effluent 223. The clean water can be further processed with optional post-treatment processing, such as a trickling filter, then treated with UV light 246 to provide a final disinfectant of the water prior to releasing it into the ocean, bay, river, lake or subterranean water source. The 300 µm screen 230 can remove, for example, materials that fall within the macro particulate range such as sand, hair and the like. The centrifugal fluid system 240 is adapted and configured, as disclosed herein, the remove particles in the micro particulate range, as well as some in the macro molecular range. For the most part, particles greater than 0.1-0.2 µm can be removed during processing in the centrifugal fluid filtration system 240. These particles include, for example, *E. coli, cryptosporidium, giardia* cysts, and other bacteria and pathogens. Further information about filtering is provided in FIG. 3.

Figure 2B:
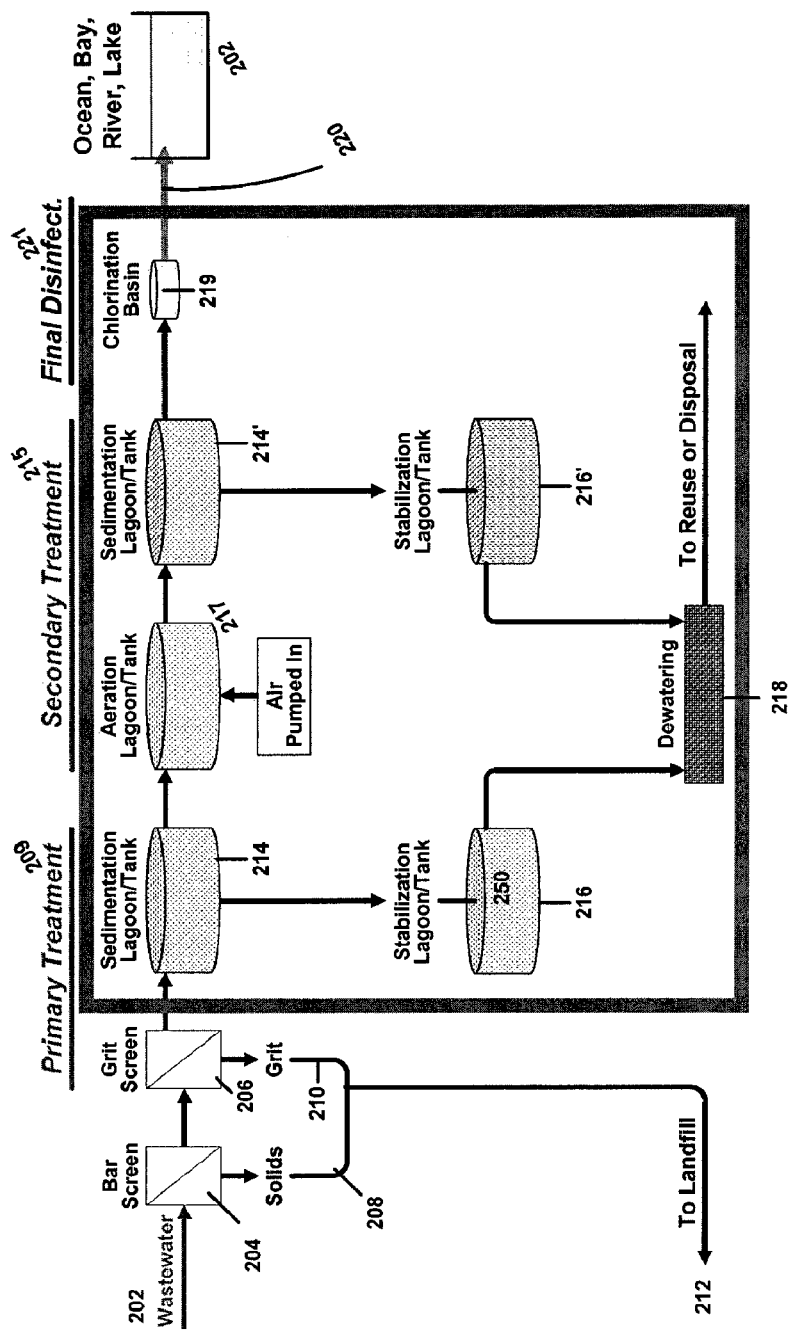

Another feature of the invention is that the undigested biosolids can be transferred to an anaerobic digester 250 where methane gas is produced which can be a source of heat and electrical energy generation to either run the operation of the centrifugal fluid filtration system, provide electricity to municipal systems, or both. The remaining output from the anaerobic digester are digested biosolids, which are transferred to a storage container 252 from which they can be sold as fertilizer or used as landfill. With this overview of the system of the invention, it can be appreciated that many of the current operations of wastewater treatment facility can be eliminated, as shown in FIG. 2b. Thus, up to five separate operations can be eliminated which results in substantial time savings in processing water. Additionally, the elimination of up to five separate operations can also result in an estimated electric/energy savings of up to 66%. These include, for example, replacing the primary treatment 209, secondary treatment 215, and final disinfectant stages 221, including the numerous and substantially sized sedimentation lagoon 214, 214', aeration lagoon 217, stabilization lagoon 216, 216' and dewatering system 218 which removes water from sludge. Additionally, chlorination 219 can be eliminated as a disinfectant as a result of the use of UV 246. The elimination of chlorination, in turn eliminates the need to dechlorinate, which is required after chlorination because of chlorine's residual effects on the environment and marine life. Dechlorination, however, is not without its drawbacks and elimination of the chlorination-dechlorination cycle altogether is a desirable outcome which is achieved in this system.

As will be appreciated by those skilled in the art, the fluid processed according to the devices, systems and methods of the invention include, but are not limited to liquids, gases, and/or any mixture or combination thereof. Thus, for example, a fluid/solid matrix can include a fluid that is either a liquid or a gas, or any mixture or combination thereof that contains constituents or solids, whether dissolved, suspended, settleable, particulate, or any combination thereof. Constituents or solids can include, for example, those constituents that are or were contained in the fluid/solid matrix whether dissolved, suspended, settleable, or particulates, as well as any combination thereof.

The influent, influent flow, and influent stream typically refer to fluid/solid matrices that enter a continuous or batch feed single pass centrifugal fluid filtration device that is adapted and configured to contain one or more single pass filters or modular filter units for the purpose of undergoing separation or filtration. The filter unit or units of the system typically include, for example, a single pass filter or a filter module in which the fluid and constituents within the fluid/solid matrix can be separated in a single pass, such as the single pass separation of fluid from the fluid/solid matrix or the single pass separation of fluid and one or more constituents from the fluid/solid matrix. Other suitable filters would be apparent to those of skill in the art based on the teachings of the disclosure. Accordingly, filters, permeable membranes, and separation medium includes any filter or membrane made of any material that will allow fluid in the fluid/solid matrix to pass, with or without constituents, through the porous medium thereby effecting separation.

The filtration processes enabled by the invention allow fluid in a fluid/solids matrix or fluid and one or more constituents in a fluid/solid matrix to be separated by a separation medium.

Unlike current solutions that trap and/or adsorb components that are too large to pass through the pores of a separation medium to produce a filter cake, this system is able to process large constituents as a result of the enhanced Coriolis effect.

Figure 3:
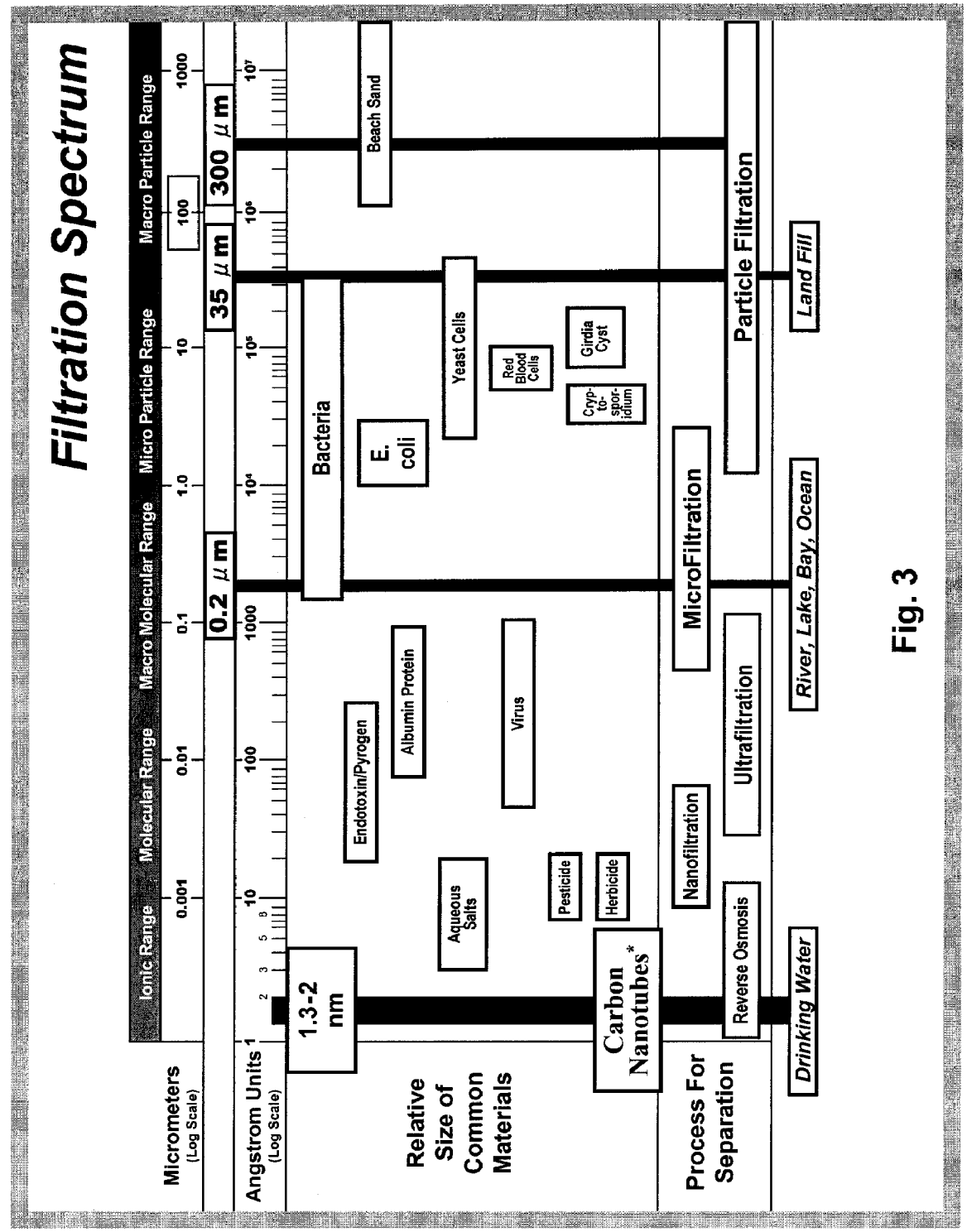
FIG. 3 is a chart showing a filtration spectrum which illustrates the relative size of elements that are filtered as well as the process for separation.

FIG. 3 is a chart showing a filtration spectrum which illustrates the relative size of elements that are filtered as well as the process for separation.

Figure 4A:
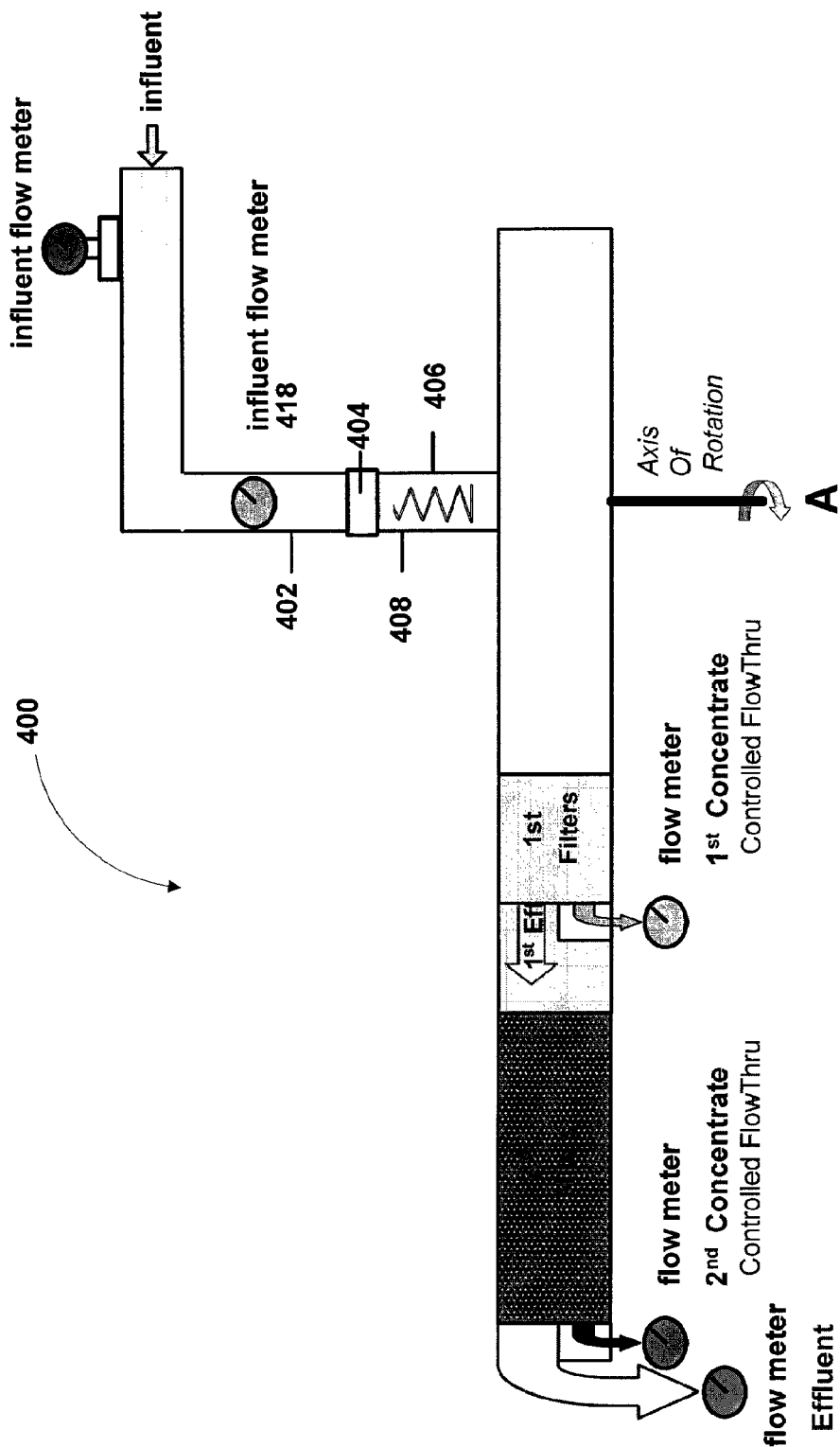
Figures 4B, 5:
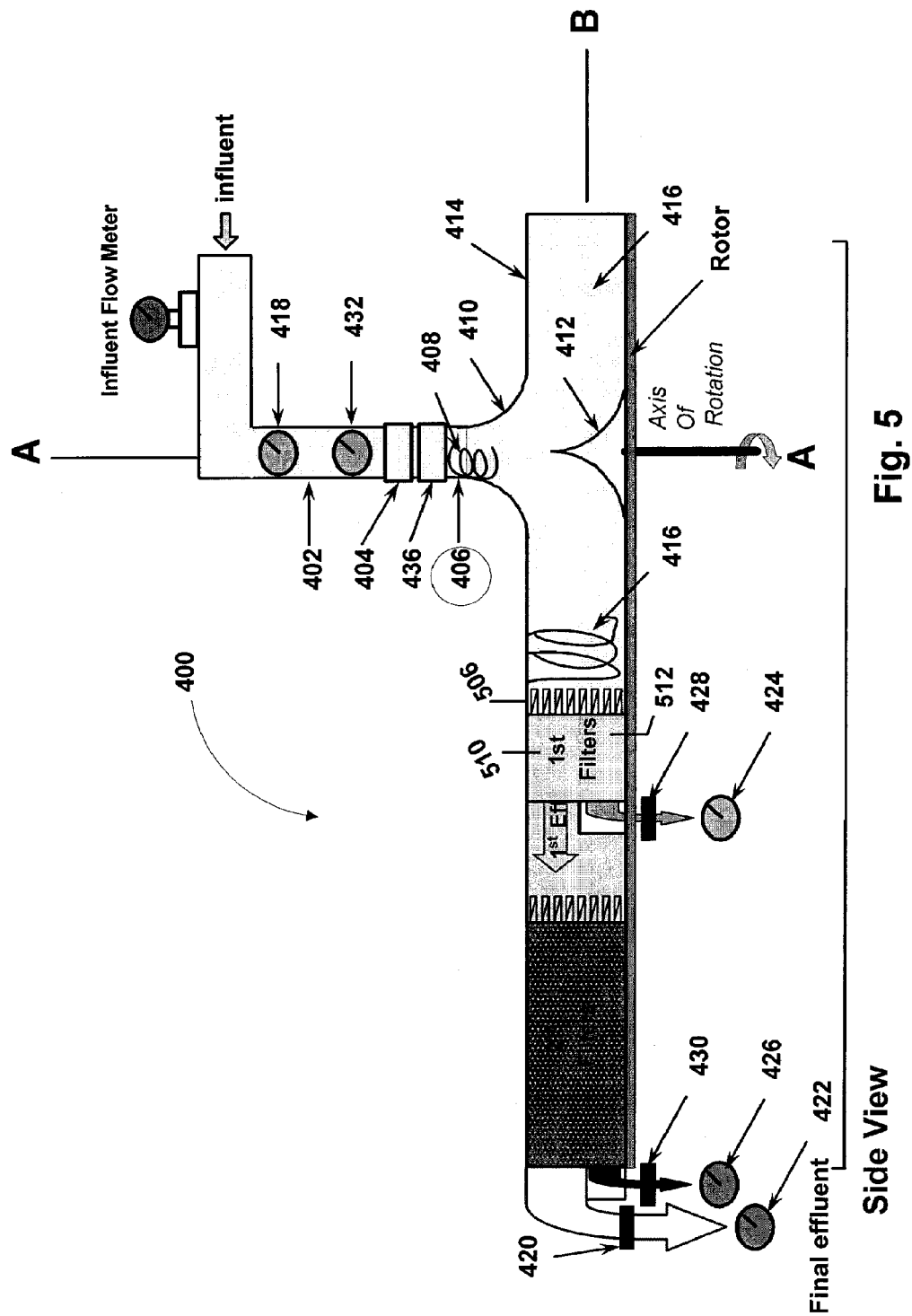
Figure 5B:
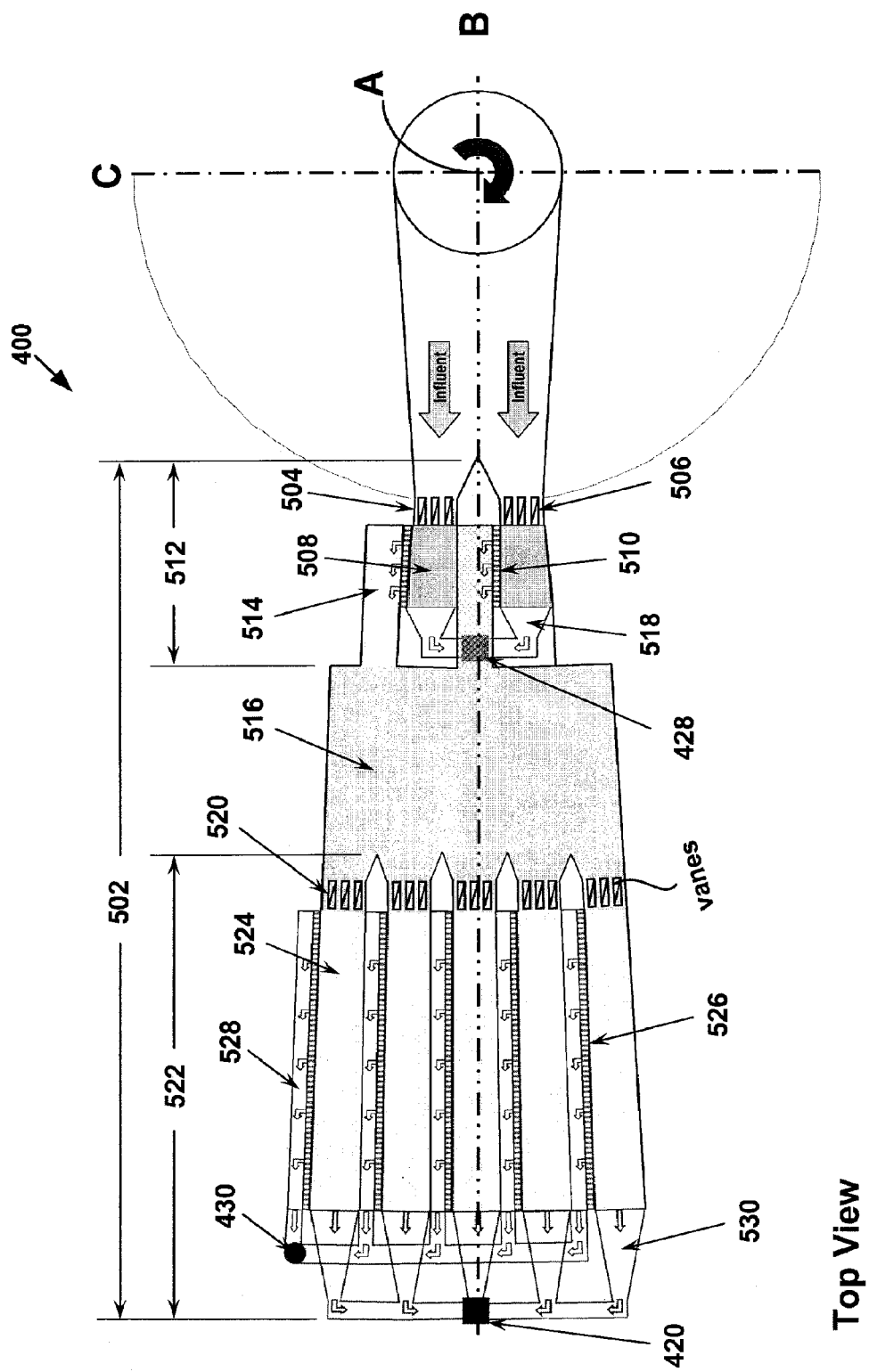

FIGS. 4A-C are side views showing the flow of the matrix to be treated through a fluid filtration device 400 according to various embodiments of the invention. FIG. 4A shows generally fluid monitoring and balancing, FIG. 4B fluid monitoring in further detail, and FIG. 4C illustrates components of the system. In operation, a non-rotating influent, e.g., wastewater flows from a non-rotating influent tube 402, is attachable to a liquid/air tight union 404, which in turn is attachable to a rotating influent feed tube 406. Positioned within the rotating influent feed tube 406 are one or more twisted influent vanes 408 which can be adapted and configured to transfer some of the influent motion as energy to the operation of the spinning centrifuge. This transfer of motion can, for example, assist in spinning of the centrifuge. The use of a centrifuge in the design of the system provides an energy efficient method for generating water head pressure which enables filtering a fluid, such as wastewater, with less energy, time, space and cost.

Additionally, a flared section 410 may be provided at the bottom of influent feed tube 406 along with a cone shaped section 412 within the influent receiving bowl 414. This configuration produces a curvilinear flow path through the system away from the axis of rotation A. When the rotating influent enters the influent bowl 414 it may flow away from the axis of rotation in a curvilinear flow path in an attempt to equalize the flow. Within the receiving bowl 414 there may be speed enhancing vanes 416 that cause the influent to approach and/or equal a rotation speed of the centrifuge (which is comprised of all the components of the device excluding the collection rings), prior to or at the time the influent enters the first filter unit influent receiving conduits 504 in FIG. 5A. The receiving bowl 414 has an aperture or opening in its side wall that communicates with an aperture in the radial arm 502 through which the receiving bowl influent (which becomes receiving bowl effluent as it leaves the receiving bowl) travels into the radial arm. If first filter unit influent receiving conduit 504 is not attached to the influent bowl 414 but is attachable to a radial arm 502, the influent will still flow through first filter unit influent receiving conduit 504. In some embodiments, first filter unit influent receiving conduit 504 can be attachable to radial arm 502. However, as will be appreciated by those skilled in the art, it could be attachable to either one of the influent bowl 414 or the radial arm 502. Within first filter unit influent receiving conduit 504 there may be twisted influent vanes 506 that may cause the influent to rotate, prior to entering the first filter unit filtration/concentration chambers 508. These twisted influent vanes 506 may cause additional, dynamic turbulences (e.g., Coriolis forces) across the filters 510 in the first filter unit 512. The Coriolis acceleration should provide an antifouling influence on the filters in the rotating separation systems.

FIGS. 5A-E illustrate a radial arm component of the fluid filtration system from a top-down view. The radial arm 502 can be integrated and attachable, in two or more arms, to a centrifuge rotor centrally positioned. The radial arms 502 rotate about a central axis A, which can be a vertical axis of rotation. The radial arms 502 are balanced such that when in operation flow is optimized and balance is maintained. Each radial arm 502 is further comprised of component parts which include one or more of the following: a first influent receiving conduit 504, which can be attached to a filter unit; a first filter unit 512, a first filtration or concentration chamber 508, a first effluent chamber 514, a first concentrate controlled through-orifice 428, an effluent/influent chamber 516, a second influent receiving conduit 520, a second filter unit 522, a second filtration or concentration chamber 524, a second effluent chamber 528, an effluent controlled flow-through orifice 430, and a second concentrate controlled flow-through orifice 420.

The centrifugal fluid filtration device has an influent flow capability that is comprised of a fluid or solid matrix in which a fluid can be either a liquid or a gas. Furthermore, the fluid or solid matrix can be either dissolved, suspended, or settleable (i.e., capable of falling out of solution). The influent flow capability provides for the influent flow to be aligned parallel with an axis A of rotation, such as a vertical axis. The influent enters along the axis from above. Furthermore, the influent is perpendicular to a dynamically balanced horizontal spinning rotor, which in turn may be comprised of one or more pieces. Providing the influent flow from above facilitates removal of fluids from a continuously fed fluid or solid matrix. The influent can furthermore be selectively separated to remove solids as well as to accommodate a wide range of volumes. Additionally, the concentration of the removed solids can be control by controlling the centrifugation. Additionally, the concentration of the removed solids can be controlled by a concentrate controlled flow-through orifice 428, 430 (FIG. 4*c*).

As will be appreciated by those skilled in the art, the influent entering the system can be rotating or non-rotating. Where the influent is non-rotating, it can have a fixed or variable pressure vertical flow and the influent flow can be from either above, below or both. Additionally, the non-rotating influent flow can flow into the fluid filtration device through, for example, a non-rotating influent tube. The non-rotating influent tube can be configured such that it aligns with and is parallel to the vertical axis of rotation of a centrifuge. Furthermore, the influent tube can be attachable to a rotating liquid or air tight union. Typically, the influent tube receives fixed or variable pressure influent from a source, such as a municipal sewage pipe. Sensors may be provided that are attached to the influent tube and which may sense one or more of volume, pressure, constituent and/or COD concentration.

In some embodiments, the liquid or air tight union is rotating and is configured to attach to a non-rotating influent tube and a rotating influent feed tube. In this configuration, the rotating union receives fixed or variable pressure influent from the non-rotating influent tube. The rotating influent feed tube can be configured such that it is attachable to a rotating liquid or air tight union which in turn is attachable to a non-rotating influent feed tube and a rotating influent feed tube and is adapted to receive fixed or variable pressure influent from a non-rotating influent tube. A rotating influent feed tube, which is attachable to the rotating liquid or air tight union and influent receiving bowl can be adapted to receive fixed or variable pressure influent from the rotating liquid or air tight union. Additionally, vanes may be provided in the interior of the feed tube. The vanes can be of a number, size and shape. Typically, the vanes are adapted and configured to enhance separation of the medium flux and reduce fouling and concentration polarization. Additionally, influent pressure on vanes may assist in spinning the centrifuge, thereby reducing the energy required to power the centrifuge.

The attachable radial arm segments 502 can be attachable to a spinning influent receiving bowl 414 and a dynamically balanced horizontal spinning rotor. The system 400 can be enclosed such that the radial arm 502 can separate and remove fluids from a fluid/solid matrix by filtration. Furthermore, the closed system can be adapted and configured to selectively separate solids from a fluid/solid matrix by concentrating and removing the solids from the system. Furthermore, the radial arm 502 may contain one or more first filter units 512 and/or subsequent filter units which may be in series, in parallel, or a combination thereof. One or more second influent/first effluent chambers and/or subsequent influent/effluent chambers can also be provided for receiving filtered fluid. The attachable radial arm is further adapted to remove fluids from a continuously fed fluid/solid matrix. The radial arm separately separates and removes solids from the matrix and is further adapted to selectively accommodate a wide range of fluid or solids volumes. Furthermore, selective control of the concentration of the removed solids is achievable.

An influent receiving bowl can be provided that is attachable to the rotating influent feed tube and is adapted and configured to engage the algorithmically balanced centrifuge rotor. The receiving bowl receives rotating influent from the rotating influent feed tube. The rotating influent flows away from the axis of rotation in the receiving bowl in a curvilinear flow path. Furthermore, vanes may be provided in a number, size and shape as previously described. Furthermore, the vanes can be adapted and configured such that the influent pressure on the vanes assists in spinning the centrifuge, as with other embodiments, thereby further reducing the energy requirement to power the centrifuge. As will be appreciated by those skilled in the art, centrifugally generated forces may continue to transform the influent flow into a higher-pressure horizontal multi-g radial influent flow. Furthermore rotation speed of the influent can be controlled such that it approaches and/or equals the rotation speed of the centrifuge.

Two or more influent deflectors can be provided that align, direct and distribute influent from an influent receiving bowl into a coincident influent receiving conduit. The deflectors can also be adapted and configured to align the influent from an influent/effluent (filtered fluid) chamber into a coincident influent receiving conduit. The influent receiving conduit can further be adapted and configured to orient and prepare the influent prior to entry into the filter unit. The sides of each influent receiving conduit can also be configured such that the layers are parallel to the innermost surface (skin) of the filters in each filter unit. Thus, the influent detectors facilitate further removal of fluid from a continuously fed fluid/solid matrix. Furthermore, selective separation and removal of solids from a continuously fed fluid/solid matrix is facilitated while accommodating a wide range of fluid/solid volumes. Furthermore, as with other sections of the radial arm, selective control of the concentration of the removal solids is possible.

The first filter unit influent receiving conduit can be adapted to receive higher-pressure horizontal radial influent flow from influent receiving bowl. Typically, the first filter unit receiving conduit is attachable to the first filter unit or attachable to the influent receiving bowl, depending on the configuration. The actual configuration for attaching the first filter unit influent receiving conduit can vary depending upon the specifications.

Vanes can also be provided in the filter unit which, as with other vanes, can vary in number size and shape to enhance Coriolis acceleration to increase flux and to reduce fouling and concentration polarization. The first filter unit is attachable to a radial arm and first filter unit influent receiving conduit. Alternatively, the first filter unit is attachable to the influent receiving bowl if the first filter unit influent receiving conduit is attached to the first filter unit. The actual location of the first filter unit can be varied depending upon the specification of the system. One or more filters can also be provided.

The height, and width and other specifications of filters can be variety as required. A second filter unit and filtration concentrate chamber can be provided which has an effective width determined by the specification of the system. Fluid and permeable constituents will flow tangentially through each separation medium into a respective first filter unit effluent chamber as a result of centrifugally generated multi-g radial forces, which creates a trans-membrane pressure. Additionally, non-permeable constituents concentrated in each filtration/concentration chamber also flows unobstructed under centrifugally generated multi-g radial forces through piping, to a common first filter unit concentrate controlled flow-through orifice.

One or more first filter unit effluent chambers are provided which have an effective width of one or more filters, along with the resultant volume. The actual dimensions of the first filter unit effluent chambers are determined from the specification. Back-flush capability can be provided, as needed. The back-flush capability may also balance the rotor during operation. Back-flushing can be performed manually, automatically or semi-automatically. Additionally, back-flushing can be sequentially performed. Furthermore, the volume within the effluent chambers may be less than, equal to, or greater than the mass volume of the filters. The smaller the effluent chamber volume, the smaller the total volume required to achieve any desired back-flush ratio. The first filter unit effluent chamber is further adapted to receive effluent from separation medium, as required. Furthermore, effluent flows freely under centrifugally generated multi-g radial forces into common effluent/influent chamber.

A first filter unit concentrate controlled flow-through orifice can be provided that is adapted and configured to receive constituent concentrate under centrifugally generated multi-g radial forces. The constituent concentrate is received through piping, from one or more first filter unit concentration chambers. The first filer unit can quantitatively regulate volume flow and/or constituent concentration, as desirable. Additionally, the first filer unit can be adapted and configured for manual control and/or algorithm control, such as by a computer network. Sensors may be attached to the piping, before or after the orifice, in any order. Suitable sensors include, but are not limited to concentrate volume sensors, and constituent concentration sensors. The constituent concentrate flows freely—under centrifugally generated multi-g radial forces—into a common first concentrate collection ring, which is adapted and configured to receive constituent concentrate—under centrifugally generated multi-g radial forces—through piping from the first filter unit concentrate controlled flow-through orifice. This configuration enables the concentrate to flow freely out of the system, where it can be, for example, transported to a landfill or other location, to be determined by the operator or end user.

An effluent/influent chamber can also be provided. The effluent/influent chamber can be adapted and configured to receive effluent from first filter unit effluent chamber. The chamber can also become an influent chamber for the second filter unit. Furthermore, fluid head—effluent/influent meniscus—can be provided between second and first filter unit. The fluid head can, for example, be integrated from the outside radius of the separation medium in the second filter unit to the inside radius of the effluent chamber in the first filter unit. Variation in the measured fluid head, when applied to the centrifugally generated multi-g radial forces, can increase or decrease the flux of fluid across the separation medium in the second filter unit.

Typically, the first filter unit and the second filter unit are balanced to improve fluid flow. As the effluent/influent meniscus approaches the inside radius of the first filter unit effluent chamber, a build-up of back pressure across the separation medium can cause a decrease in fluid flux in that filter unit. However, when the effluent/influent meniscus reaches the inside radius of the first filter unit effluent chamber, the flux across the separation medium in that filter unit will equal the flux across the separation medium in the second filter unit. Fluid flow will then be in balance between the first and second filter units.

A second filter unit influent receiving conduit can also be provided that receives influent from an effluent/influent chamber. The second filter unit influent receiving conduit can further comprise vanes in its interior, the number, size and shape of which are selected to enhance Coriolis acceleration to increase separation medium flux and to reduce fouling and concentration polarization of the filter. A second filter unit may also be provided that is attachable to the radial arm. The second filter unit may contain one or more filters therein, with the height and width of the filter determined from the specification. Fluid permeable constituents, under centrifugally generated multi-g radial forces, flow tangentially through each separation medium into a respective second filter unit effluent chamber during use. This centrifugally generated multi-g radial force creates trans membrane pressure which facilitates the tangential flow of the effluent. The non-permeable constituents concentrated in each filtration/concentration chamber can then flow unobstructed under the centrifugally generated multi-g radial forces through piping, to a common second filter unit concentrate controlled flow-through orifice.

One or more second filter unit effluent chambers are provided which have an effective width and resultant volume which are determined from specification. Additionally, back-flush capability can also be provided, the extent of which will be determined from specification. The volume within the effluent chambers may be less than equal to, or greater than, the mass volume of the filters. By providing a smaller effluent chamber volume, a smaller total volume is required to achieve any desired back-flush ratio of the system. The second filter unit effluent chamber is further adapted to receive effluent from separation medium. In operation, the effluent flows freely under centrifugally generated multi-g radial forces through piping, into a common effluent controlled flow-through orifice.

An effluent controlled flow-through orifice is provided that receives effluent under centrifugally generated multi-g radial forces through piping, from one or more second filter unit effluent chambers. The effluent controlled flow-through orifice is adapted to quantitatively regulate and/or measure volume flow through the orifice. Additionally, as with other components of the system, the effluent controlled volume flow can be manually controlled or algorithmically controlled. A variety of sensors can also be provided which are attached to the piping before, within, or after the orifice, or combinations thereof. The sensors include, for example, effluent volume sensors, constituent concentration sensors. In operation, the effluent flows freely under centrifugally generated multi-g radial forces through the orifice into a common effluent collection ring.

The common effluent collection ring is adapted and configured to receive effluent under centrifugally generated multi-g radial forces through piping from effluent controlled flow-through orifice. In operation the effluent flows freely out of the system where it can be further processed, or treated in a manner desired by the operator.

A second filter unit concentrate controlled flow-through orifice which is adapted to receive constituent concentrate under centrifugally generated multi-g radial forces through piping, from one or more second filter unit concentration chambers can be provided to quantitatively regulate volume flow and/or constituent concentration. The second filter unit concentration controlled flow-through orifice can also be manually controlled or algorithmically controlled. Furthermore, one or more sensors can be provided in any order. Sensors include, for example, concentrate volume sensors and constituent concentration sensors. In operation, the constituent concentrate flows freely under centrifugally generated multi-g radial forces into a common second concentrate collection ring.

The second concentrate collection ring is adapted to receive constituent concentrate from the second filter unit concentrate controlled flow-through orifice under centrifugally generated multi-g radial forces. The second collection ring enables concentrate to flow freely out of the system where it can be gravity fed or pumped into an anaerobic digester or treated in another manner. The anaerobic digester can further be configured to treat the concentrate received to produce methane to generate electricity and/or heat. The energy generated can then be internally used to power the system and surplus energy can be provided to, for example, the municipal power grid.

During the operation of the system, centrifugally generated multi-g radial forces are often associated with the constituents as they move through the system during operation. These forces are sensitive to the changing rpm of the centrifuge and may be manually controlled and/or algorithmically controlled. The trans-membrane pressure at any point across a separation medium in the system is equal to the radial g-force at that point plus the pressure from the fluid head. For a fluid head at the first filter unit, the fluid head is integrated from the outside radius of the separation medium in the first filter unit and is measured from the outside radius to the top of the rotating liquid/air tight union. The influent head can further be measured from the top of the rotating liquid/air tight union to the highest wastewater point source of the reservoir/piping coming into the centrifuge.

The system is configured to control quantitative effluent volume. The control of the effluent is determined by, for example, the wastewater protocol. The protocol can be manually controlled or algorithmically controlled to accommodate a broad range of influent volumes and/or effluent volumes. As will be appreciated by those skilled in the art, in the wastewater context, the effluent volumes are dependent upon the volume of sewage flowing into the wastewater treatment plant. Thus sewage volumes may vary from day to day, from week to week, from season to season, etc. In operation, a change in the RPM will cause a resultant change in the trans-membrane pressure and flux across each separation medium, in both the first and second filter units. Additionally, a change in influent pressure will cause a change in trans-membrane pressure and flux across each separation medium, in the first filter units provided. The change in the fluid head in the first filter unit, which can be measured from the outside radius of the separation medium in the first filter unit to the top of the rotating liquid/air tight union plus the influent head measured from the top of the rotating liquid/air tight union to the highest wastewater point source of the reservoir/piping coming into the centrifuge, will cause a change in trans-membrane pressure and flux across each separation medium, in the first filter unit of the system. Further along in the system, a change in fluid head in the second filter units, determined from an integral measurement of the outside radius of the separation medium in the second filter units, to the meniscus; wherever it may be in the effluent/influent chamber or in the first filter unit effluent chambers, can also be controlled.

A quantitative effluent volume ($QE_v$) can be calculated which equals influent volume ($I_v$) minus first filter unit constituent concentrate volume ($FCC_v$) minus second filter unit constituent concentrate volume ($SCC_v$).

$$QE_v = I_v - FCC_v - SCC_v$$

This determination can be manually controlled and/or algorithmically controlled.

Additionally, the effluent volume sensors can be provided to measure effluent volume flow from the effluent control flow through orifice, which can be manually controlled and/or algorithmically controlled to produce the desired effluent volume. An influent volume sensor can also be provided to measure influent volume flow prior to entering the rotating liquid/air tight union. The first filter unit constituent concentrate volume sensor can be adapted to measure the concentrate volume flow from the first filter unit constituent concentrate flow-through orifice. Additionally, first filter unit constituent concentrate flow-through orifice can be manually controlled and/or algorithmically controlled to produce the desired first filter unit constituent concentrate volume. The second filter unit constituent concentrate volume sensor may also be provided to measure the concentrate volume flow, e.g. from the second filter unit constituent concentrate flow-through orifice. This second filter unit constituent concentrate flow-through orifice, as with other components to the system, may be manually controlled and/or algorithmically controlled to produce a desired second filter unit constituent concentrate volume.

A wastewater protocol for quantitative constituent concentration volume can be manually controlled or algorithmically controlled to accommodate a broad range of constituent concentrations in the influent. Typically, the influent constituent concentration equals the concentration of those constituents in the sewage that flows into the wastewater treatment plant. As a result, sewage volumes and constituent concentrations may vary throughout the day, from day to day, from week to week, from season to season, etc. The quantitative constituent concentrate volume ($QCC_v$) can be controlled by controlling a value of the volume where the quantitative constituent concentrate volume equals first filter unit constituent concentrate volume ($FCC_v$) plus second filter unit constituent concentrate volume ($SCC_v$)

$$QCC_v = FCC_v + SCC_v$$

The volume can be manually controlled and/or algorithmically controlled as with other processes in control of the system.

The first filter unit constituent concentrate volume sensor can measure concentrate volume flow from the first filter unit constituent concentrate control flow-through orifice. A second filter unit constituent concentrate volume sensor can also be provided that measures concentrate volume flow from the second filter unit constituent concentrate control flow-through orifice. These sensors can also be manually controlled and/or algorithmically controlled to produce the desired filter unit constituent concentrate volume, or any other constituent concentrate volume that may be required or desirable.

A further protocol for quantitative biodegradable chemical oxygen demand ("COD") recovery can be provided for wastewater treatment. This protocol can be manually controlled or algorithmically controlled to accommodate a broad range of biodegradable COD concentrations in the influent.

The influent COD concentrations are typically set to equal the concentration of the COD in the sewage that flows into the wastewater treatment plant. However, as will be appreciated by those skilled in the art, the COD concentrations can vary throughout the day, from day to day, from week to week, from season to season, etc. To control the COD, a determination is made of the COD in the concentrate volume ($COD_{cv}$) which equals the total COD in the influent volume processed ($COD_{ivp}$).

$$COD_{cv} = COD_{ivp}$$

This process can be manually controlled and/or algorithmically controlled, as with other processes controlling the system. In controlling the process, the final COD volume ($FCOD_v$) is controlled to equal the processed influent volume ($PI_v$), either through manual or algorithmic control.

$$FCODv = PI_v$$

An influent COD concentration sensor can be provided that measures the influent COD concentration prior to entering the rotating liquid/air tight union. This sensor can be placed at a location in the system that is determined during the specification design phase. The sensor is adapted and configured to measure the average daily COD. This can be achieved by assaying a sample from the system one or more times within a 24 hour period. A final COD concentration sensor can also be provided to measure the final COD concentration from the second filter unit constituent concentration control flow-through orifice. This sensor can be manually controlled and/or algorithmically controlled to produce a COD concentration measurement that can be used to yield the maximum methane production from the anaerobic digester. Based on the measurement of the sensor, COD flows to the anaerobic digester can be controlled.

As will be appreciated by those skilled in the art, the filter units can take on a variety of configurations without departing from the scope of the invention. Thus, for example, the first filter unit may contain one or more of the following components: an influent receiving conduit; vanes associated with the influent receiving conduit; filters; filtration/concentration chambers; effluent chambers; concentrate flow-through orifices; concentrate volume sensors; constituent concentration sensors. The second filter unit can also contain one or more of the following components: effluent/influent chambers; influent receiving conduits, which can be adapted to have vanes therein; filters; filtration/concentration chambers; effluent chambers; effluent controlled flow-through orifices; effluent volume sensors; effluent constituent concentrate sensor; concentrate flow-through orifices; concentrate volume sensors; constituent concentration sensors.

Each radial arm component of the system can be adapted and configured to be attachable to the influent receiving bowl, and/or the centrifuge rotor, which may be dynamically balanced. Additionally, each radial arm may be adapted and configured such that it has one or more first filter unit influent receiving conduits, if the conduits are not attached to the first filter units; first filter units; piping that is attachable to the first filter unit concentrate controlled flow-through orifice or concentrate volume sensor or constituent concentrate sensor and that is further adapted to slidingly attach to the first concentrate collection ring; a second filter unit; a piping attachable to the second filter unit concentrate controlled flow-through orifice or concentrate volume sensor or constituent concentration sensor which is slidingly attached to the second concentrate collection ring; piping attachable to the effluent controlled flow-through orifice or effluent volume sensor or effluent constituent concentrate sensor and slidingly attachable to the effluent collection ring. Two or more arms can be provided. The radial arms can be provided in multiples of two and attachable to both the receiving/distribution bowl and the centrifuge rotor. Alternatively, the radial arms can be provided in multiples of two to four to the capacity of the rotor.

Filter back-flushing can also be provided at various points in the system which is manually controlled and/or algorithmically controlled. The control may be predetermined or may be determined by end user. Typically, the back-flush pressure is determined from the specifications. Typically, sufficient pressure is provided to overcome the influent pressure on the separation medium. A back-flush shut off can also be provided, if desired. The back-flush shut off may be configured to shut-off with one or more of the effluent controlled flow-through orifice, the first filter unit controlled flow-through orifice, or the second filter unit controlled flow-through orifice.

Back-flush fluid can also be provided which is from a suitable water source, such as a clean water supply, effluent from the centrifugal fluid filtration device, or any other suitable source as determined by the user. Additionally, steam, air or any other suitable material can be used to provide back-flush fluid to the system. The frequency of back-flushing can be determined by the specification of the system and controlled by, for example, time or other factors, including environmental factors. The back flush frequency can be manually and/or automatically set to occur at pre-determined time levels, or in response to sensor readings. The back-flush frequency is typically set to maintain an overall maximum separation from the medium flux as it passes through the system. Thus, for example, whenever one of a pair of radial arms of the system has a separation medium flux that is inside or outside a preset range, the back-flush can be performed to bring the range within specification. Additionally, if each radial arm of a system is back-flushed for five minutes, where the system contains twelve radial arms, then each pair of radial arms will be back-flushed two times per hour. As will be appreciated by those skilled in the art, it may be that the back-flushing frequency/interval may be hours, days, weeks, etc., before there is a sufficient reduction in the separation medium flux. In that case, adjusting the rpm of the centrifuge may be all that will be required to maintain a stable flux. Thus, for example, if six pair of radial arms are in operation at the same time and at a predetermined rpm and one pair of radial arms is to be back-flushed, the RPM can be increased to maintain the original volume flow from the remaining five pair of radial arms.

Rotor imbalance settings and tolerances can be determined from specification. To determine rotor imbalance the effluent volume sensor in each radial arm may indicate when a pair of radial arms are out of balance. When an imbalance occurs that is beyond a preset range limit, back-flushing may begin to bring that pair of radial arms into balance. Furthermore, the system cart be configured to provide a decrease in separation medium flux. To achieve this decrease, the effluent volume sensor in each pair of radial arms is used to monitor the separation medium flux to determine when back-blushing should occur.

Additionally, the system can be configured to provide sequential back-flush capability. The sequential back-flush capability is achieved by sequentially, e.g., two opposed radial arms, back-flushing the radial arms while the remaining radial arms continue to perform their designed filter operations. The sequential back flush capability has a back-flush ratio based on a total mass volume of the separation medium in the first and second filter units being used as the volume ratio basis for back-flushing. Thus, for example, the volume in the first and second effluent chambers may be sufficient to achieve the desired back-flushing, or alternatively multiples of that volume as determined from the specification may be needed.

Turning now to FIGS. 5C-E, FIG. 5C illustrates an embodiment of the invention from a top view where two radial arms 502a, 502b are used. In the embodiment shown in FIG. 5D three radial arms 502a, 502b, 502c are used, and in the embodiment in FIG. 5E a plurality of radial arms 502a, 502b . . . 502n are used. The number of radial arms used in a particular embodiment can vary depending on the system requirements and is not limited to the illustrations shown.

Figure 6:
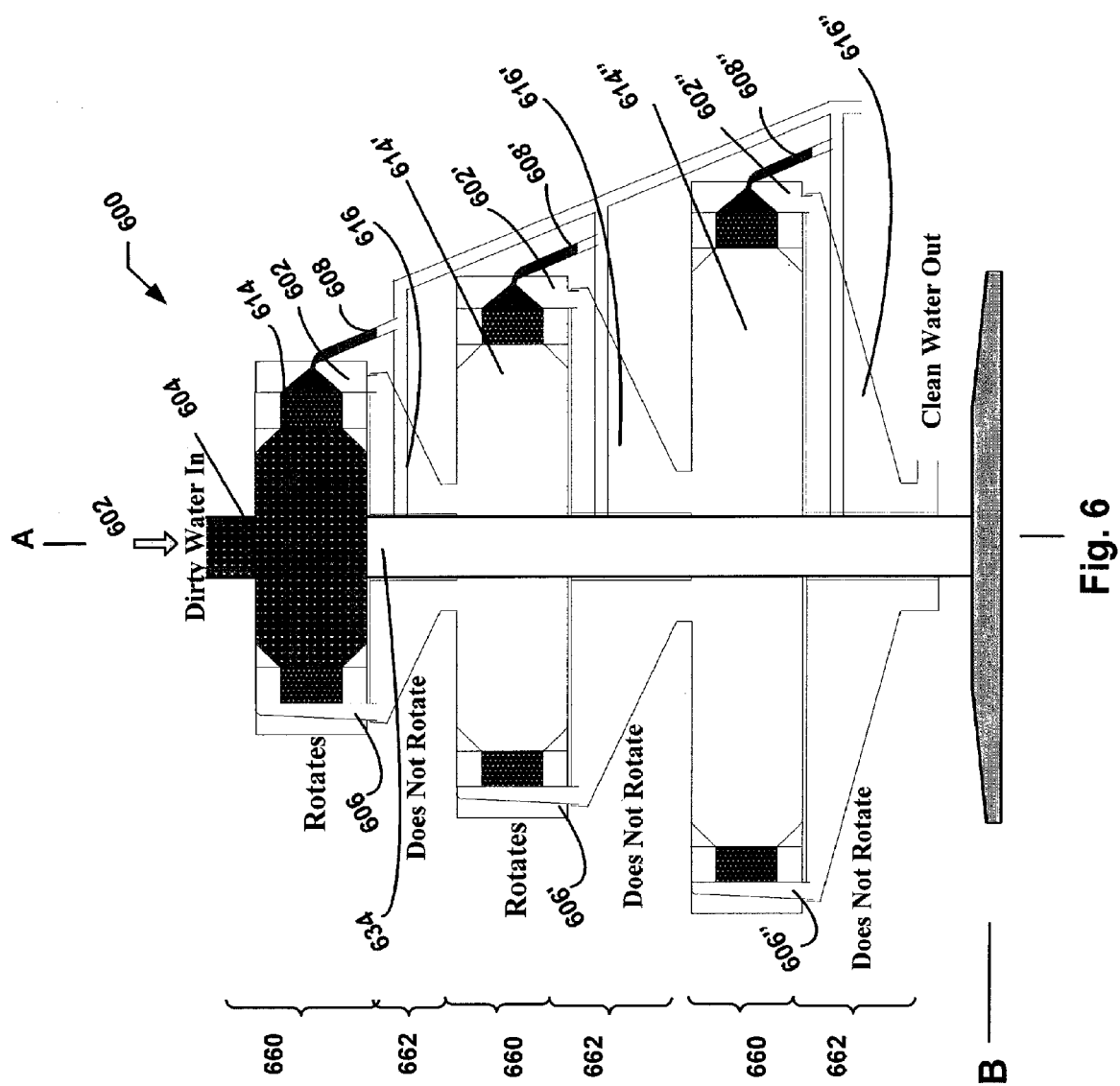
FIG. 6 illustrates a cross-sectional view of a fluid filtration system of the invention with stacked rotors.

FIG. 6 illustrates a cross-sectional view of a fluid filtration system 600 of the invention with stacked rotors. The system is designed to have a series of stacked, alternating, rotating and non-rotating segments. Influent 602 flow can be provided on demand. By providing on demand capability, the system 600 can adjust to changes in the volume of influent flow as it may change from time to time, e.g., during a twenty-four hour cycle, influent of wastewater will be higher in the morning, for example, than it would be late in the evening. The RPM of a spinning rotor 634 can be adjusted to produce a rate of filtration and separation that correlates with the changing influent volume flow. This feature enables removal of fluids from a continuously fed fluid/solid matrix. Additionally, selective separation and removal of solids from a fluid or solid matrix can be achieved as well as the selective accommodation of a wide range of fluid/solid volumes. By controlling the RPM additional control can be achieved over the concentration of the removed solids. The system can have batch feed capabilities, depending upon the specifications and needs of the end user. Alternatively, the system can accommodate a continuous feed, or semi-continuous feed as the case may be.

A stationary influent feed tube is attachable to a spinning influent feed tube 604, such as by a rotating liquid or air tight union. The stationary influent feed tube 604 is adapted to feed influent 602 into a spinning influent receiving bowl 614. Thereafter, the spinning influent feed tube 604 is attachable to a spinning influent receiving bowl 614. The spinning influent feed tube 604 is adapted and configured to feed influent 602 into the spinning influent receiving bowl 614. Furthermore, the spinning influent receiving bowl 614 is attachable to and rotates with a dynamically balanced horizontal spinning rotor 634. The spinning influent feed tube 604 and/or the spinning influent receiving bowl 614 can further be adapted to contain internal anti-vortex vanes that are adapted and configured to reduce and/or eliminate influent turbulence when influent is fed into the feed tube or receiving bowl. Furthermore, the spinning influent receiving bowl 614 can be further adapted and configured to feed influent into one or more attachable radial arm segments not shown in FIG. 6. The influent feed tube 604 and influent receiving bowl 614 thus are adapted and configured to remove fluids from a continuously fed fluid/solid matrix by selectively separating and removing solids from a continuously fed fluid/solid matrix. Furthermore, the size and configuration of the influent feed tube 604 and influent receiving bowl 614 can be selectively modified to accommodate a wide range of fluid or solid volumes as desired. Furthermore, the influent feed tube 604 and the influent receiving bowl 614 can be adapted and configured to selectively control the concentration of the removed solids during the centrifugation filtering process. A plurality of rotating 660 and non-rotating 662 sections can be provided which progressively clean the water as it moves through the system from top to bottom. At each level outlets are provided through which the undigested biosolids are transferred out of the centrifugal fluid filtration system 600 to, for example, the anaerobic digester. Typically, it will be expected that each of the components as well as the fluid/solid matrix will rotate in the same direction, e.g. clockwise or counter-clockwise about a central axis disposed within, for example, a discrete component of the system. However, it will be appreciated by those skilled in the art, in some instances components and/or fluid/solid matrix contained therein may, from time-to-time, rotate in opposing directions or appear to rotate in opposing directions where, for example, components are in series but positioned parallel one another.

Each level incorporates a radial arm 602 that can be integrated and attachable, in two or more arms, to a centrifuge rotor centrally positioned, a first influent receiving bowl 614, which communicates with a first filtration pipe 606, and first filtration concentration pipe 608, a non-rotating effluent/influent chamber 616. At each level, concentrates can exit the influent receiving bowl 614 after filtration as concentrate which can then be collected separately or combined in any combination. As the system is stacked additional influent receiving bowls 614' 614", filtration pipes 606', 606", filtration concentration pipes 608', 608" and non-rotating effluent/influent chambers 616'; 616" can be provided at each level.

Figure 7B:
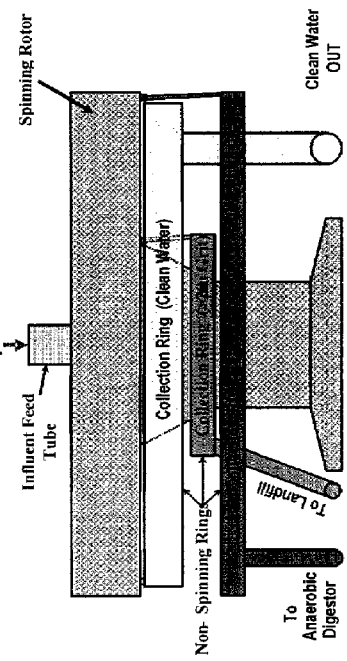
FIGS. 7A-C illustrate side views of collection rings.
Figure 7A:
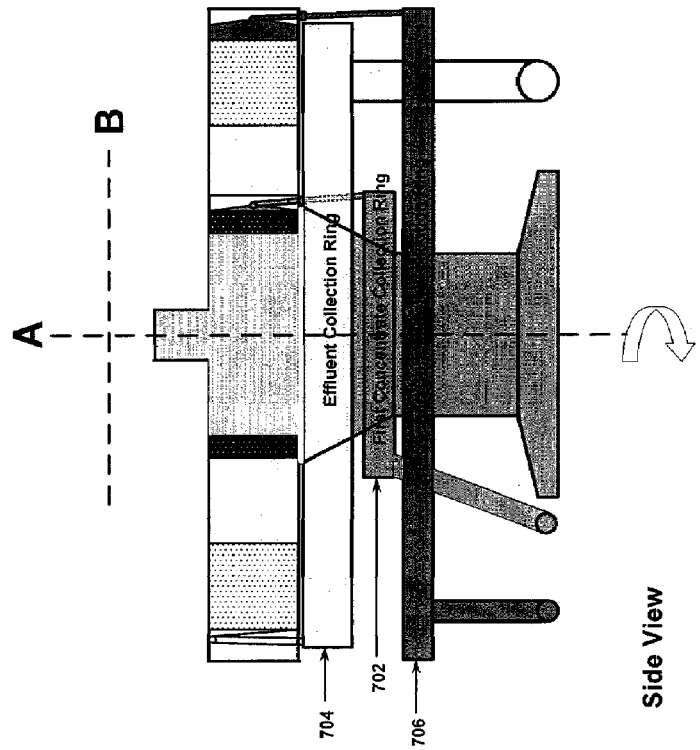
Figure 7C:
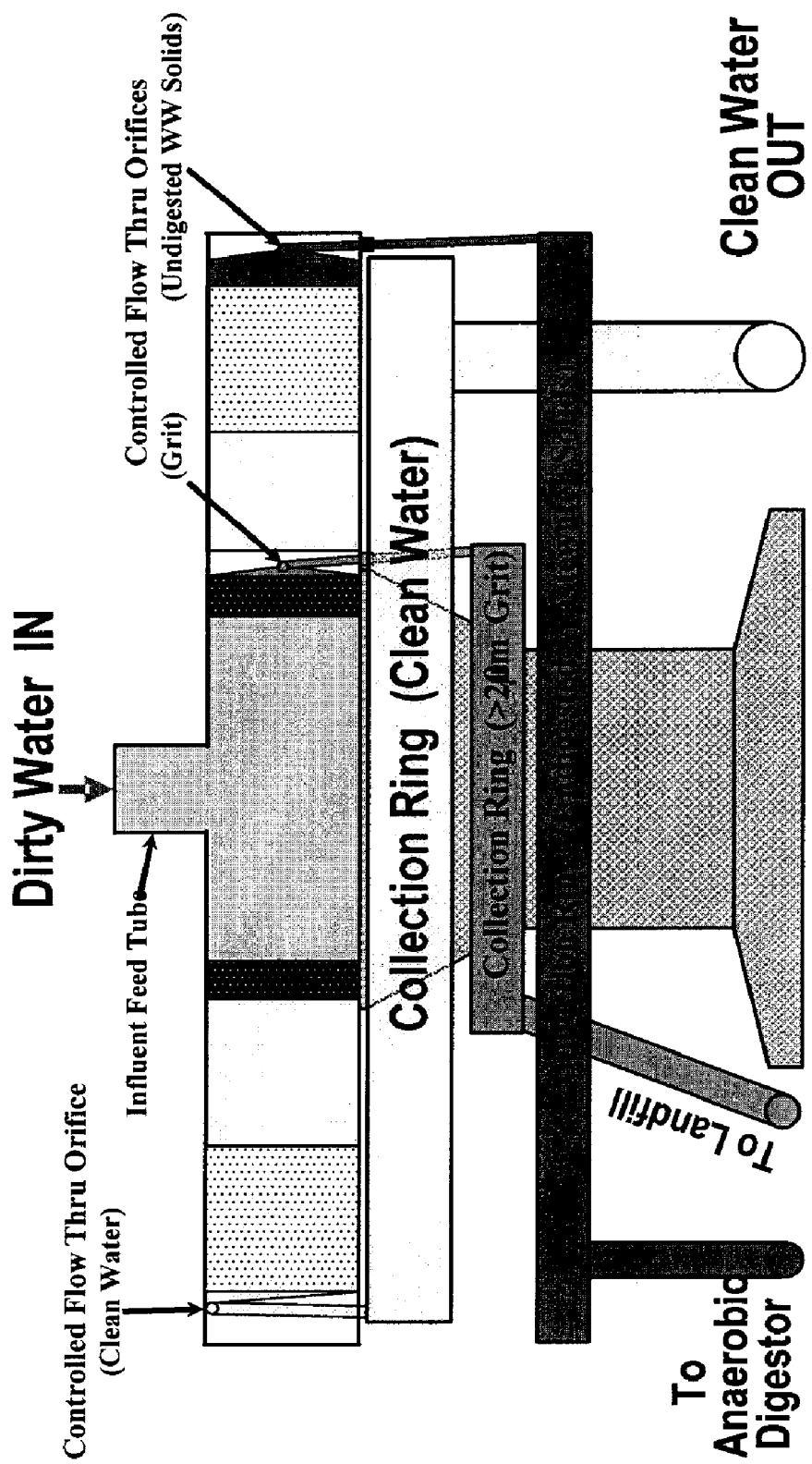

FIGS. 7A-C illustrate side view of an embodiment using collection rings. Dirty water enters the system from the top into a spinning rotor. The filtration process in this configuration occurs as described in FIGS. 3-5, above. Below the spinning rotor is an effluent collection ring 704 for collecting the clean water, a collection ring 702 for collecting grit having a particle size greater than 20 μm (micron), and a collection ring 706 for collecting undigested wastewater solids. The collection rings are in turn connected to a clean water source, such as bays, rivers and ocean, an anaerobic digester, or a landfill.

Figure 8:
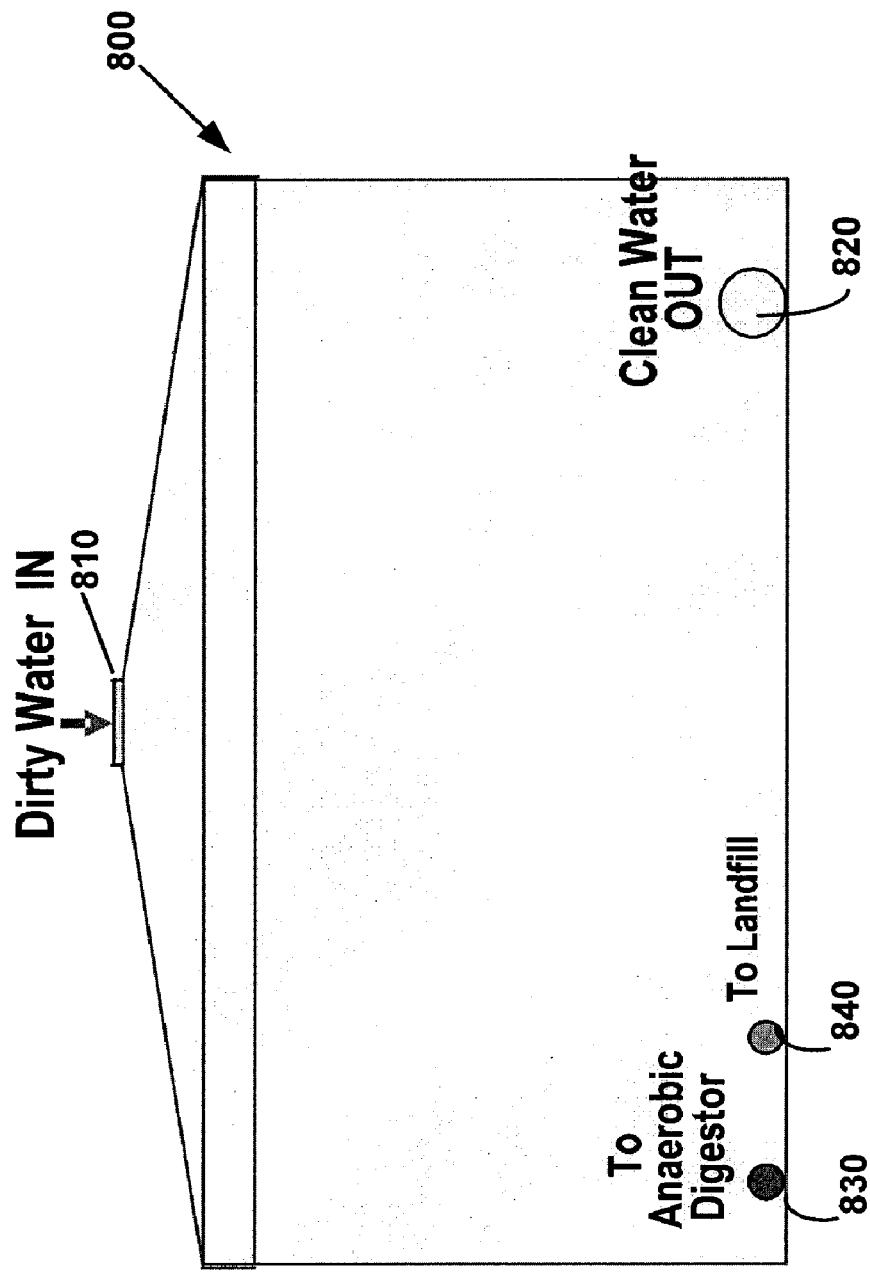
FIG. 8 illustrates a filtration housing unit.

FIG. 8 illustrates a filtration housing unit 800 for any of the filtration devices disclosed above including an inlet for influent 810, an outlet for effluent 820, and outlets for an aerobic digester 830 and landfill 840. The dimension of the device is scaleable and variable to the application. However, the device is capable of efficiently processing a volume adjustable to 500,000 gallons/day per unit in an indoor space of, for example, approximately 7'×7' with a height of 3' without the control mechanism. A space of approximately, 14'×14'×10' can be used to house the system. The device eliminates the need for settling and aeration ponds, described above in FIG. 1. Additionally, the small size and ability to locate in an indoor facility further resolves security issues that currently surround wastewater treatment facilities and makes the devices feasible in a plurality of locations within a community, obviating the need for one large multiple acre facility in a remote location.

Figure 9:
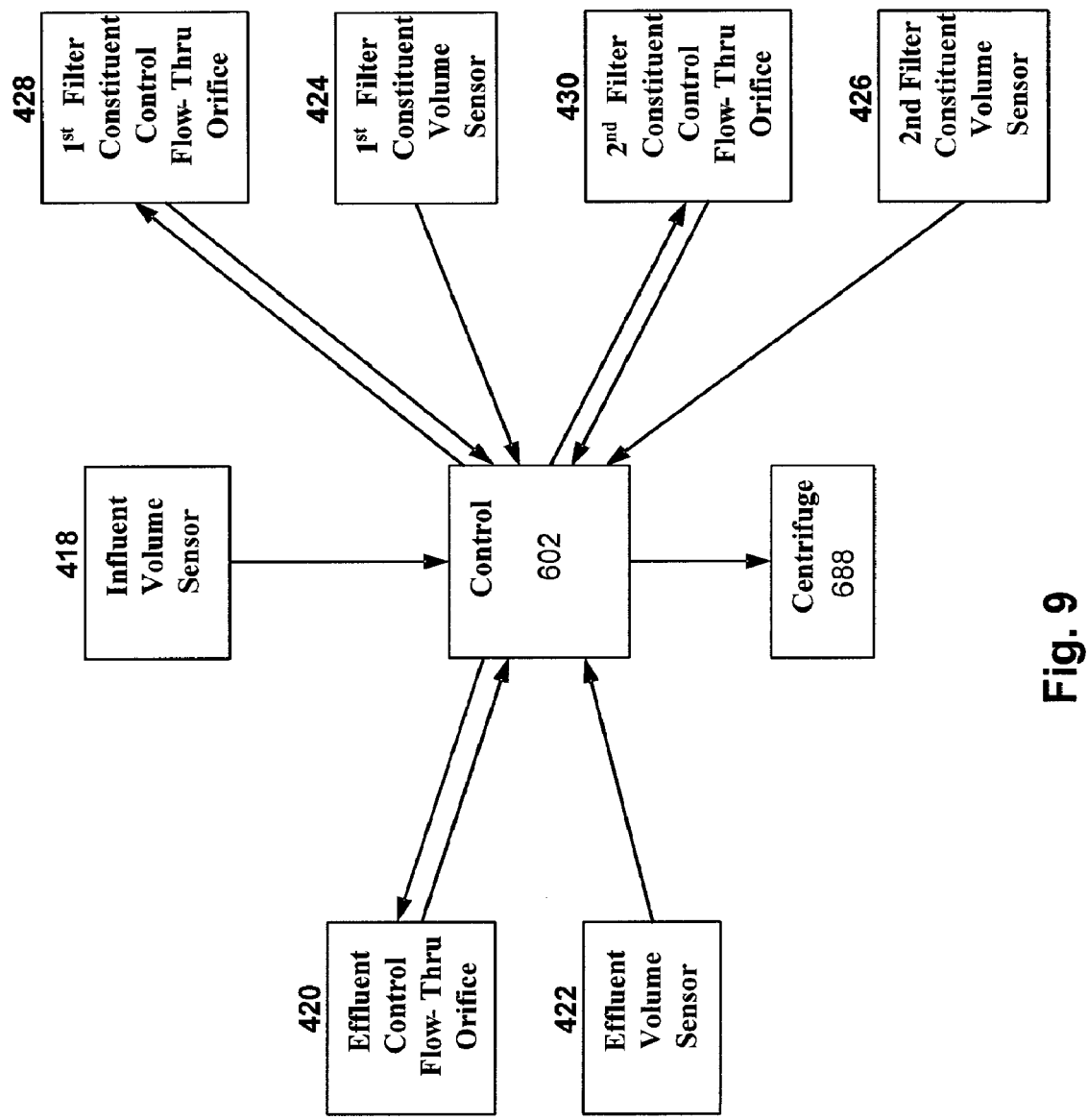
FIG. 9 illustrates a block diagram for manual or algorithmic control of the system.

FIG. 9 illustrates a block diagram for manual or algorithmic control of the system. Algorithmic control can be automatic or semi-automatic as desired. For influent/effluent flow on demand capability the rpm of the centrifuge 688 can be adjusted and controlled 602 manually or algorithmically to balance a broad range of influent volumes and/or effluent volumes. The influent volume is measured by the influent volume sensor 418 and the effluent volume is controlled by the effluent control flow-through orifice 420 and measured by the effluent volume sensor 422. Other measurements and controls include first filter constituent control flow-through orifice 428, first filter constituent volume sensor 424, second filter constituent control flow-through orifice 430, and second filter constituent volume sensor 426. Additional filter control flow-through and volume sensor units may be added as needed.

In one embodiment of the present invention, quantitative recovery capability is possible. Quantitative recovery capability may be manually or algorithmically controlled, for example, see FIG. 9, for effluent volume, constituent volume, or constituent concentration and/or biodegradable COD. The quantitative effluent volume measured at 422 and controlled by the effluent controlled flow-through orifice 420 is equal to the influent volume measured at 418 minus the first filter unit constituent concentrate volume ($1^{st}$ fucc (filter unit constituent concentrate)) measured at 424 minus the $2^{nd}$ fucc volume measured at 426. The total quantitative constituent volume may be measured at the $1^{st}$ fucc volume sensor 424 and controlled by the $1^{st}$ fucc controlled flow-through orifice 428 plus the $2^{nd}$ Fucc volume measured at 426 and controlled by the $2^{nd}$ fucc controlled flow-through orifice 430. The quantitative constituent and/or biodegradable COD may be controlled by first measuring the concentrate (w/v) at the influent constituent and/or COD concentration sensor at 418 and adjusting 430 to achieve the desired final COD concentration. Where adjusting 428 and 430 will achieve the desired final total constituent concentration measured at 424 and 426 respectively.

Figure 10:
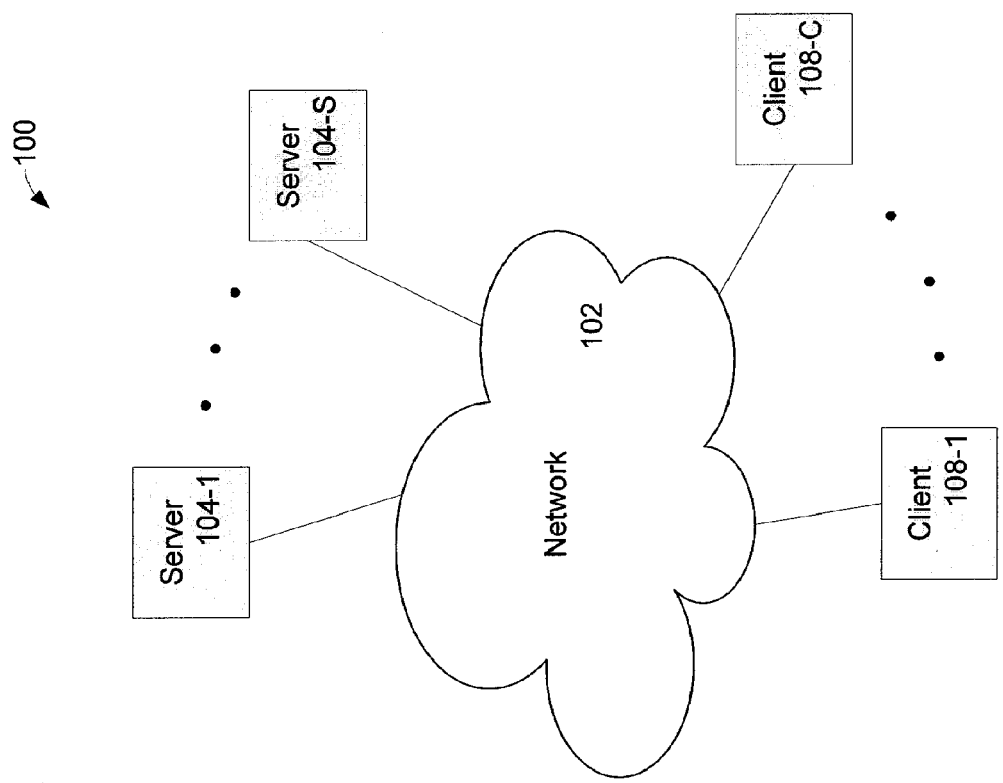
FIG. 10 illustrates a network environment for controlling the system.
Figure 11A:
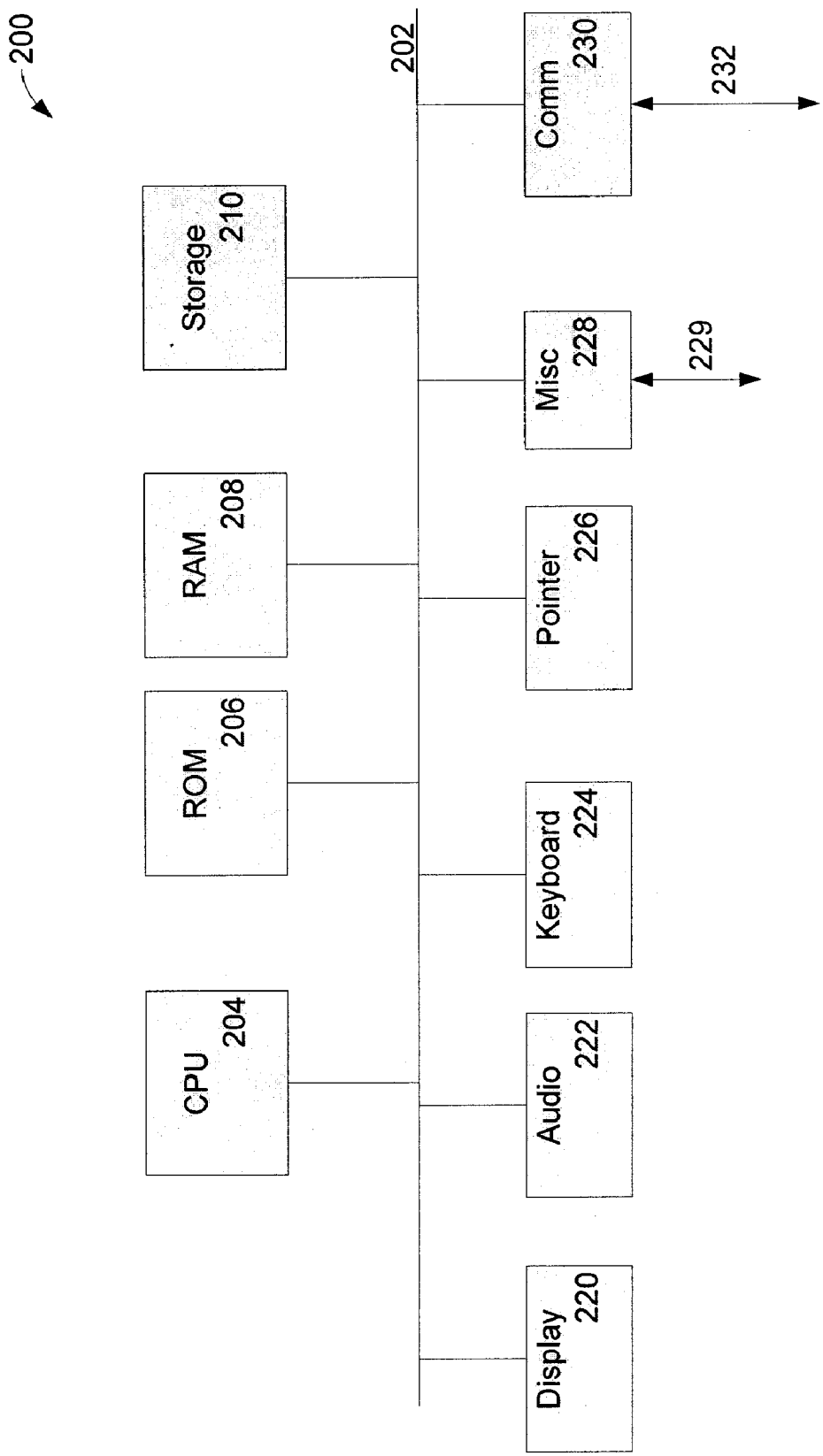
FIGS. 11A-B illustrate a computer system in which embodiments of the invention are controlled.
Figure 11B:
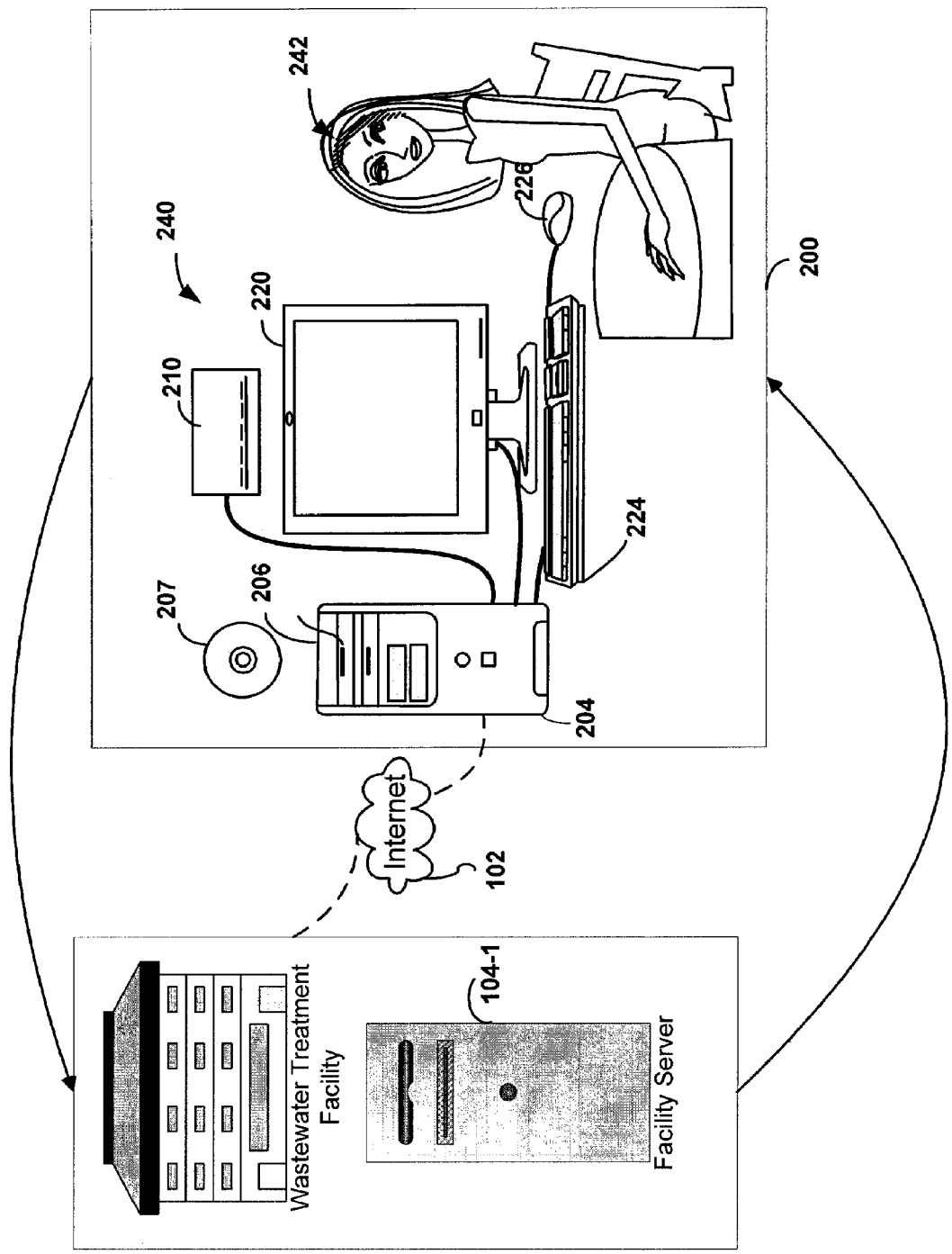

FIG. 10 illustrates a network environment 100 for controlling the system in which the techniques described may be controlled and/or monitored. The network environment 100 has a network 102, such as an Internet connection, that connects one or more servers 104-1 through 104-S, and one or more clients 108-1 through 108-C. FIGS. 11A-B illustrate a computer system 200, which may be representative of any of the clients and/or servers shown in FIG. 10, as well as, devices, clients, and servers in other Figures.

Referring back to FIG. 10, FIG. 10 illustrates a network environment 100 in which the techniques described may be controlled and/or monitored. The network environment 100 has a network 102 that connects servers 104-1 through 104-S, and clients 108-1 through 108-C. As shown, several computer systems in the form of servers 104-1 through 104-S and clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of visual communicating means or device whether local or remote, such as a LAN, a WAN, a system bus, etc. Thus, the invention may find application at both the S servers 104-1 through 104-S, and C clients 108-1 through 108-C.

Referring back to FIGS. 11A-B, FIGS. 11A-B illustrates a computer system 200, which may be representative of any of the clients and/or servers shown in FIG. 10. The computer system 200 may be configured to operate automatically or semi-automatically after initiation. The system can include a works station 240 operated by a user 242 who is either located within the wastewater treatment facility, or remotely located to the facility and connected by a server, e.g. through the Internet. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220 (for example, embodiments of the present invention), CD or DVD 207 capability, audio, 222, keyboard 224, pointer or mouse 226, miscellaneous input/output devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (Firewire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Comm 230 via 232 might be, for example, controlling an embodiment of the present invention, such as, but not limited to rpm, orifice control, etc. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIGS. 11A-B are possible.

Some portions of the description of the operation of the systems disclosed may be presented in terms of algorithms and symbolic representations of operations on, for example, data bits within a computer memory. Typically, algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, etc.), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Figure 12:
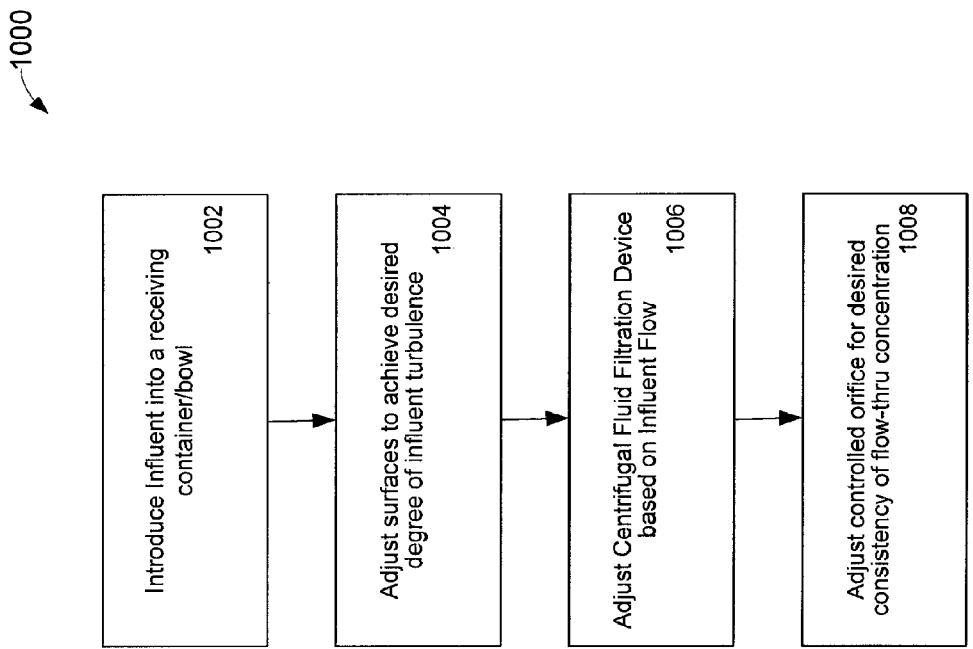
FIG. 12 is a block diagram showing the steps of a method for controlling the system.

FIG. 12 is a block diagram showing the steps of a method for controlling the system generally at 1000 in block diagram form. At 1002 an influent is introduced into a receiving bowl or container. At 1004 surfaces are adjusted, such as, but not limited to vanes, to achieve a desired degree of influent turbulence. At 1006 the centrifugal filtration device is adjusted based on the influent flow. At 1008 the orifices are adjusted to achieve a flow-through concentration. Thus a method and apparatus for centrifugal filtration have been described.

The devices, systems and methods of the invention are optimized to efficiently and cost-effectively treat, for example, wastewater while simultaneously producing energy and reducing green house gas output. It is projected that the impact of the devices, systems and methods can be summarized by industry in Table 1 where there is a 66% reduction of energy consumption in municipal wastewater treatment systems, 10-25% reduction in energy consumption in the industrial and agricultural sector, and 40-60% reduction in waster usage in the food processing sector.

TABLE 1

Summary of Clean Energy Technologies Projected Potential by

| Technology | Electricity Production (GWh/year) | Emissions Reduction (metric ton) | | | |
|---|---|---|---|---|---|
| | | $CO_2$ | $NO_x$ | $SO_x$ | Hg |
| Anaerobic Digestion - Industrial WW | 300 | 0.16 | 199 | 695 | 0.00 |
| Anaerobic Digestion - Agriculture WW | 1,400 | 0.82 | 993 | 3,478 | 0.02 |
| Anaerobic Digestion - Municipal WW | 7,200 | 4.20 | 5,091 | 17,835 | 0.09 |
| TOTAL: | 8,900 | 5.18 | 6,283 | 22,008 | 0.11 |

(NOTE: $CO_2$ @ million metric tons)

Thus, from TABLE 1, the annual electricity potential in GWh is more than the 2005 production of Hoover Dam (3233), Glen Canyon Dam (3209), and Shasta Dam (1806), combined. The electricity production of 8900 GWb/year is roughly equivalent to 15.9 million barrels of oil and an emission reduction equivalent to 1.2 million cars off the road. Thus, per gallon of fluid filtered, the devices, systems and methods of this invention may achieve up to a 66% reduction energy demand with a corresponding reduction in green house gas emission.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for performing fluid filtration through a plurality of radial arms rotating about an axis in a filtration unit, each of said plurality of radial arms comprising therein a twisted influent vane and a first filter and a second filter disposed in-series, the method comprising:

obtaining a source influent from a larger target source of fluid to be filtered;

transferring said source influent to said plurality of radial arms rotating about an axis;

passing said source influent through said twisted influent vanes to enhance a Coriolis effect on said source influent, thereby forming an enhanced Coriolis-effected influent;

passing said Coriolis-effected influent from said twisted influent vanes through said first filter to create a filtrate and a first concentrated solid;

passing said filtrate through said second filter to create a final filtered fluid effluent and a second concentrated solid;

separately discharging said first concentrated solid and said second concentrated solid from said radial arms; and discharging said final filtered fluid effluent, wherein said Coriolis effect has an antifouling effect as said source influent crosses said first and second filters disposed within each of said radial arms and wherein said fluid filtration removes organic particles having a size of about 0.2-35 microns.

* * * * *